United States Patent
Makino et al.

(10) Patent No.: US 9,613,444 B2
(45) Date of Patent: Apr. 4, 2017

(54) INFORMATION INPUT DISPLAY DEVICE AND INFORMATION INPUT DISPLAY METHOD

(71) Applicant: PANASONIC CORPORATION, Osaka (JP)

(72) Inventors: Hiroyasu Makino, Osaka (JP); Hiroto Yanagawa, Osaka (JP); Takashi Isobe, Nara (JP)

(73) Assignee: PANASONIC CORPORATION, Osaka (JP)

( * ) Notice: Subject to any disclaimer, the term of this patent is extended or adjusted under 35 U.S.C. 154(b) by 123 days.

(21) Appl. No.: 14/427,657

(22) PCT Filed: Apr. 18, 2014

(86) PCT No.: PCT/JP2014/002201
§ 371 (c)(1),
(2) Date: Mar. 12, 2015

(87) PCT Pub. No.: WO2014/174814
PCT Pub. Date: Oct. 30, 2014

(65) Prior Publication Data
US 2015/0235391 A1   Aug. 20, 2015

(30) Foreign Application Priority Data

Apr. 26, 2013 (JP) ................. 2013-094490

(51) Int. Cl.
*G06T 11/20* (2006.01)
*H04N 5/265* (2006.01)
(Continued)

(52) U.S. Cl.
CPC .......... *G06T 11/20* (2013.01); *G06F 3/03545* (2013.01); *G06T 11/203* (2013.01); *G06T 11/60* (2013.01); *H04N 5/265* (2013.01)

(58) Field of Classification Search
None
See application file for complete search history.

(56) References Cited

U.S. PATENT DOCUMENTS 5,237,650 A * 8/1993 Priem ............... G06T 15/503
345/419
5,619,631 A * 4/1997 Schott ............... G06F 3/0481
345/440
(Continued)

FOREIGN PATENT DOCUMENTS

JP 04-073684 3/1992
JP 05-265441 10/1993
(Continued)

OTHER PUBLICATIONS

International Search Report, mailed Jul. 1, 2014, in corresponding International Application No. PCT/JP2014/002201.

*Primary Examiner* — Phi Hoang
*Assistant Examiner* — Steven Elbinger
(74) *Attorney, Agent, or Firm* — Greenblum & Bernstein, P.L.C.

(57) ABSTRACT

An information input/display device including: a sensor detecting contact and outputting contact positions; a display unit displaying video signals each corresponding to one screen; a first drawing unit generating first video signals each corresponding to one screen, when displayed, that includes an image of a drawing of a continuous line formed by the contact positions; a second drawing unit generating second video signals each corresponding to an image of the drawing of the continuous line, the second drawing unit generating images of the drawing of the continuous line at a higher speed than the first drawing unit; and an adding unit adding each of the second video signals to a corresponding one of the first video signals. Images of the drawing of the continuous line generated by at least one of the first drawing (Continued)

unit and the second drawing unit change as time elapses in drawing processing.

7 Claims, 20 Drawing Sheets

(51) Int. Cl.
*G06F 3/0354* (2013.01)
*G06T 11/60* (2006.01)

(56) References Cited

U.S. PATENT DOCUMENTS

| | | | |
|---|---|---|---|
| 5,761,340 A | 6/1998 | Suzuki | |
| 6,329,991 B1* | 12/2001 | Fukuda | G06F 3/04883 345/629 |
| 2008/0151115 A1* | 6/2008 | Agung | H04N 5/265 348/510 |
| 2009/0237401 A1* | 9/2009 | Wei | G06T 11/203 345/423 |
| 2011/0249007 A1* | 10/2011 | Kuster | G06T 11/001 345/441 |
| 2012/0229471 A1* | 9/2012 | Takai | G06F 3/04845 345/443 |

FOREIGN PATENT DOCUMENTS

| | | |
|---|---|---|
| JP | 06-124166 | 5/1994 |
| JP | 06-332611 | 12/1994 |
| JP | 08-286808 | 11/1996 |
| JP | 2010-217254 | 9/2010 |

\* cited by examiner

FIG. 4

| Pen number | 3 |
|---|---|
| Tone | (105, 105, 105) |

FIG. 5

| Pen number | Pen tip shape (Dot pattern) | Expression indicating relationship between writing pressure and pen tip size | |
|---|---|---|---|
| 1 | · | Mathematical expression 1 | |
| 2 | • | Mathematical expression 2 | |
| 3 | ● | Mathematical expression 3 | |
| 4 | ● | Mathematical expression 4 | |
| 5 | ● | Mathematical expression 5 | |
| 6 | ▬ | Mathematical expression 6 | |
| 7 | ● | Mathematical expression 7 | |

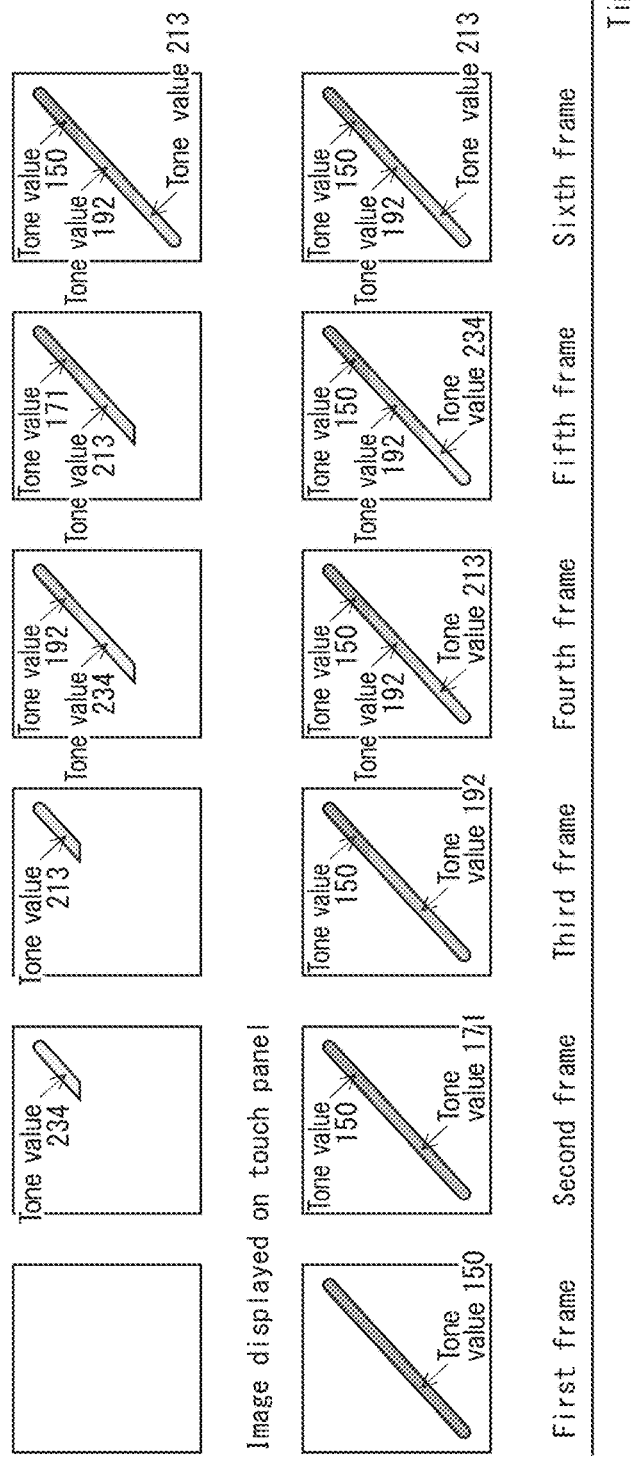

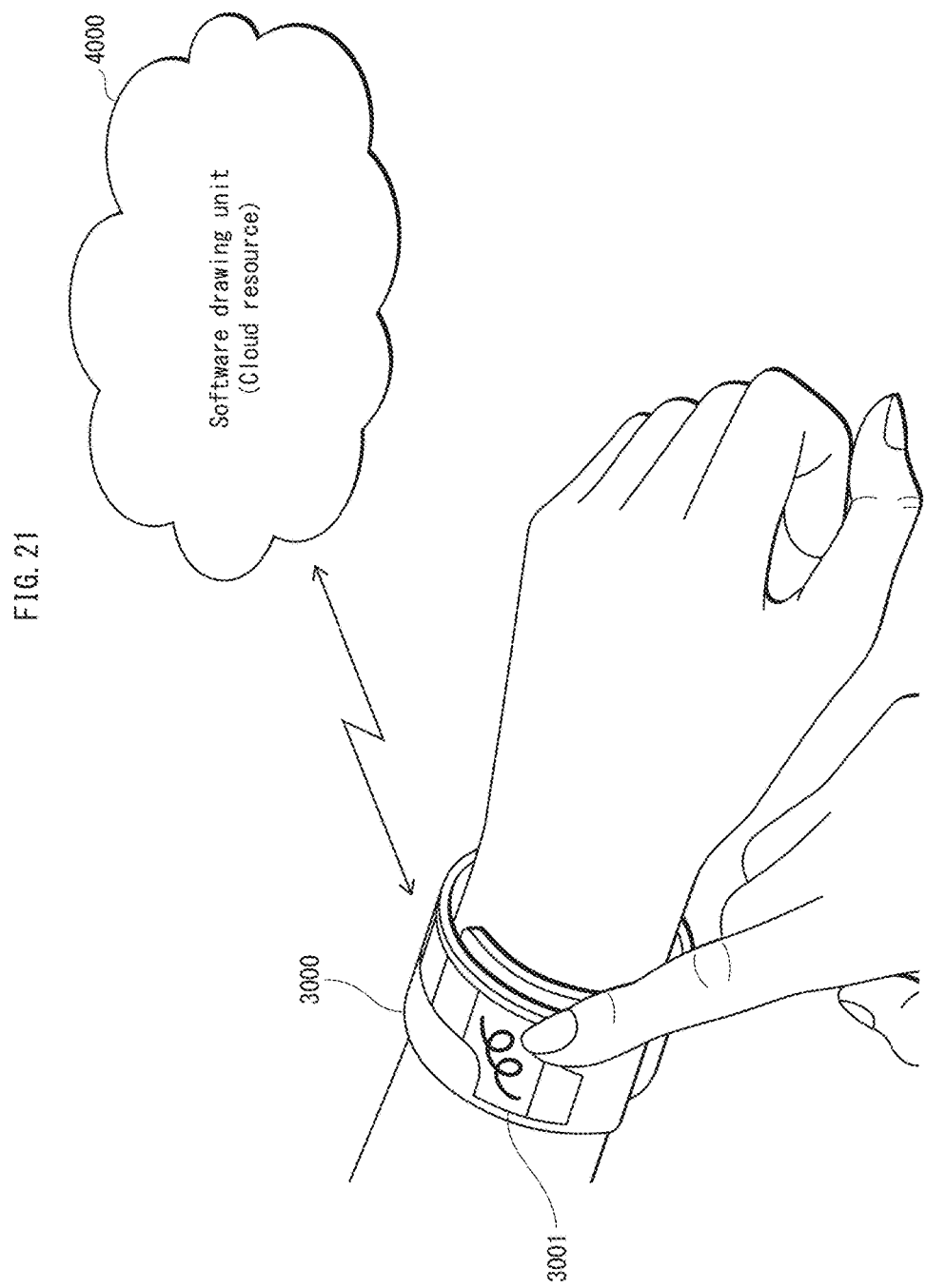

INFORMATION INPUT DISPLAY DEVICE AND INFORMATION INPUT DISPLAY METHOD

TECHNICAL FIELD

The present invention relates to information input/display devices having a touch panel. In particular, the present invention relates to a technology for reducing the amount of time from input to display, and thereby providing users a realistic writing/drawing experience.

BACKGROUND ART

A typical drawing application installed on a terminal, such as a smartphone or a tablet terminal, allows a users to write characters, draw pictures, etc., on a touch panel. In the following, a terminal device with which a user performs input by using a stylus pen (also called a touch pen or an electronic pen) is referred to as a pen tablet.

A pen tablet visualizes a trace made by a stylus pen by performing software processing. Specifically, in a pen tablet, a CPU generates a pen drawing image when a user performs pen input by using a stylus pen, and generates screen data corresponding to one frame by using a frame memory so that the screen data includes the pen drawing image. Screen data so generated is accumulated in the frame memory, is read from the frame memory at a predetermined refresh cycle, and is displayed on the touch panel (refer to Patent Literature 1).

CITATION LIST

Patent Literature

[Patent Literature 1]
  Japanese Patent Application Publication No. H06-332611
[Patent Literature 2]
  Japanese Patent Application Publication No. H04-073684

SUMMARY

Technical Problems

As already discussed above, in a typical pen tablet, generation of a pen drawing image (referred to in the following as pen drawing processing) is performed by a CPU. However, the CPU performs pen drawing processing at relatively low processing speed, due to the CPU performing various types of other software processing in the meantime in order to control the entire pen tablet.

Accordingly, a user of a typical pen tablet is given an impression that processing speed of the pen tablet is low, due to a relatively great amount of time being required until a pen drawing image is actually displayed from when the user performs pen input by using a stylus pen. In particular, a CPU in a portable pen tablet such as a smartphone or a tablet terminal has relatively low processing ability. Further, in such a portable pen tablet, while a drawing application is being executed, many other applications may be executed in the meantime. In such a case, the slowness of pen drawing processing by the CPU becomes even more prominent. This results in users being provided with an uncomfortable writing/drawing experience.

Means for Solving the Technical Problems

In view of the technical problems described above, the present invention aims to provide information input/display devices and information input/display methods that reduce the amount of time from input to display and thereby provide users a realistic writing/drawing experience.

One aspect of the present disclosure is an information input/display device including: a sensor detecting contact and outputting contact positions; a display unit displaying video signals each corresponding to one screen; a first drawing unit generating first video signals each corresponding to one screen, when displayed, that includes an image of a drawing of a continuous line formed by the contact positions; a second drawing unit generating second video signals each corresponding to an image of the drawing of the continuous line, the second drawing unit generating images of the drawing of the continuous line at a higher speed than the first drawing unit; and an adding unit adding each of the second video signals to a corresponding one of the first video signals. In the information input/display device pertaining to one aspect of the present disclosure, images of the drawing of the continuous line generated by at least one of the first drawing unit and the second drawing unit change as time elapses in drawing processing.

Advantageous Effects of Present Invention

The information input/display device pertaining to one aspect of the present invention reduces the amount of time from input to display and thereby provides users a realistic writing/drawing experience.

BRIEF DESCRIPTION OF DRAWINGS

FIG. 4 illustrates setting information.

FIG. 5 illustrates drawing control information.

FIG. 14 includes portions (a), (b), and (c) for explaining images displayed on touch panel 101 in embodiment 2.

FIG. 21 is a diagram related to modification (11), for explaining information input/display device utilizing cloud computing system.

DESCRIPTION OF EMBODIMENTS

1. Overview

Figure 1:
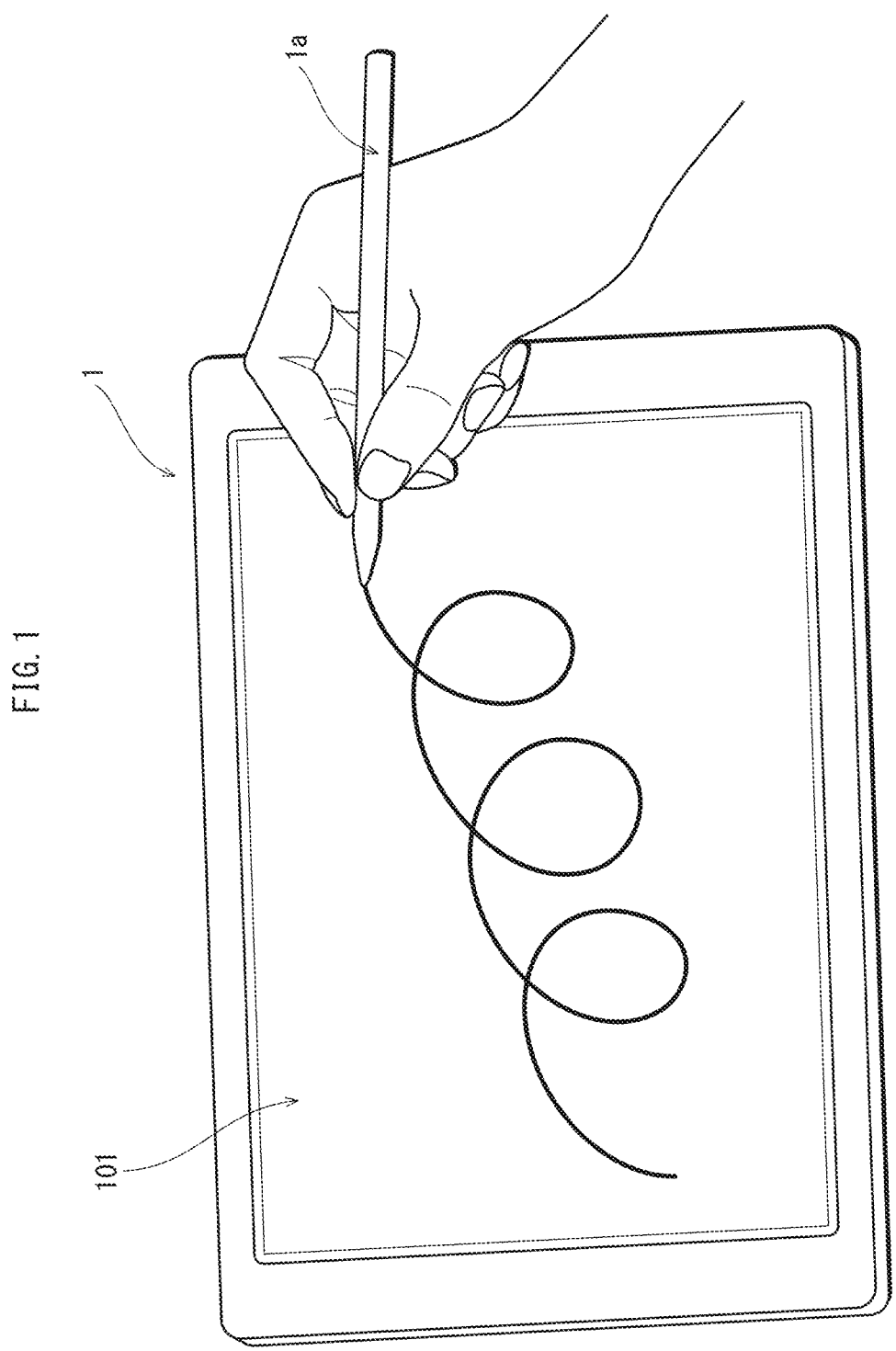
FIG. 1 illustrates the external appearance of pen tablet 1.

The inventors of the present invention, in an attempt to improve the writing/drawing experience that pen tablets provide to users, focused on the fact that pen drawing images can be displayed quickly by allocating a dedicated hardware circuit having a small-size memory to pen drawing processing (refer to Patent Literature 2).

Such a dedicated hardware circuit, when performing pen drawing processing, receives sets of coordinates indicating pen contact positions, generates images of a pen tip (referred to in the following as pen tip images), and stores the pen tip images one after another to a memory with relatively small storage capacity. Subsequently, the dedicated hardware circuit outputs the pen tip images one after another, each at an appropriate timing, through timing control. Due to this, when a dedicated hardware circuit is allocated to pen drawing processing as described above, an image of a line formed by the plurality of pen tip images cannot be stored to a frame memory for later use. The storing of such an image to a frame memory for later use is possible in pen drawing processing performed by a CPU through software processing.

Meanwhile, when causing a CPU to perform pen drawing processing through software processing and in addition, causing a dedicated hardware circuit to perform pen drawing processing, images are output from both the CPU and the dedicated hardware circuit. Compositing such images improves the writing/drawing experience that pen tablets provide to users and at the same time, enables an image of a pen drawing line to be stored to a frame memory for later use.

However, when compositing a luminance signal of an image generated by a CPU and a luminance signal of an image generated by a hardware circuit, a change of tone occurs where the images overlap. This may result in an image differing from what was intended being displayed on a display.

In view of the above, the present inventors arrived at the following embodiments of the present disclosure, which describe pen tablets that provide a natural writing/drawing experience to the user and at the same time prevent unnatural images, such as those where tone change has occurred at a portion corresponding to pen input by the user, from being displayed.

One aspect of the present disclosure is an information input/display device including: a sensor detecting contact and outputting contact positions; a display unit displaying video signals each corresponding to one screen; a first drawing unit generating first video signals each corresponding to one screen, when displayed, that includes an image of a drawing of a continuous line formed by the contact positions; a second drawing unit generating second video signals each corresponding to an image of the drawing of the continuous line, the second drawing unit generating images of the drawing of the continuous line at a higher speed than the first drawing unit; and an adding unit adding each of the second video signals to a corresponding one of the first video signals. In the information input/display device pertaining to one aspect of the present disclosure, images of the drawing of the continuous line generated by at least one of the first drawing unit and the second drawing unit change as time elapses in drawing processing.

Another aspect of the present disclosure is an information input/display device including: a sensor detecting contact and outputting contact positions; a display unit displaying video signals each corresponding to one screen; a first drawing unit generating first video signals each corresponding to one screen, when displayed, that includes an image of a drawing of a continuous line formed by the contact positions; a second drawing unit generating second video signals each corresponding to an image of the drawing of the continuous line, the second drawing unit generating images of the drawing of the continuous line at a higher speed than the first drawing unit; and an adding unit adding each of the second video signals to a corresponding one of the first video signals. In the information input/display device pertaining to another aspect of the present disclosure, the first drawing unit outputs one first video signal when having generated an image of the drawing of the continuous line that corresponds to one stroke, and the second drawing unit outputs the second video signals until the first drawing unit has generated an image of the drawing of the continuous line that corresponds to one stroke, and no longer outputs the second video signals when the first drawing unit has generated an image of the drawing of the continuous line that corresponds to one stroke.

A pen tablet pertaining to embodiment 1, which is one example of implementation of such aspects of the present disclosure, composites an image generated by a hardware circuit with respect to a frame image generated by a CPU, and performs control so that the frame image generated by the CPU and the image generated by the hardware circuit do not overlap one another at a pen drawing portion.

A pen tablet pertaining to embodiment 2, which is another example of implementation of such aspects of the present disclosure, composites an image generated by a hardware circuit with respect to a frame image generated by a CPU, and adjusts tone at a pen drawing portion where the frame image generated by the CPU and the image generated by the hardware circuit overlap one another.

A pen tablet pertaining to embodiment 3, which is yet another example of implementation of such aspects of the present disclosure, controls output timing such that a frame image generated by the CPU and a pen drawing image generated by the hardware circuit do not overlap one another.

The following describes the three embodiments, one by one.

2. Embodiment 1

The following describes a pen tablet 1, which is a first embodiment of an information input/display device pertaining to one aspect of the present disclosure.

As already described above, the pen tablet 1 pertaining to embodiment 1 composites a frame image generated through software processing and a pen drawing image generated through pen drawing processing by a dedicated hardware circuit, and performs control such that the frame image and the pen drawing image do not overlap at a pen drawing portion.

2-1. Structure of Pen Tablet 1

FIG. 1 illustrates the external appearance of the pen tablet 1.

Here, description is provided on the pen tablet 1, while taking as an example a tablet-type terminal having a touch panel 101. A user of the pen tablet 1 uses a stylus pen 1a. The stylus pen 1a conforms to the input method of the touch panel 101. The user inputs a line by putting the stylus pen 1 in contact with the touch panel 101. The line may form a picture, a character, or the like.

Figure 2:
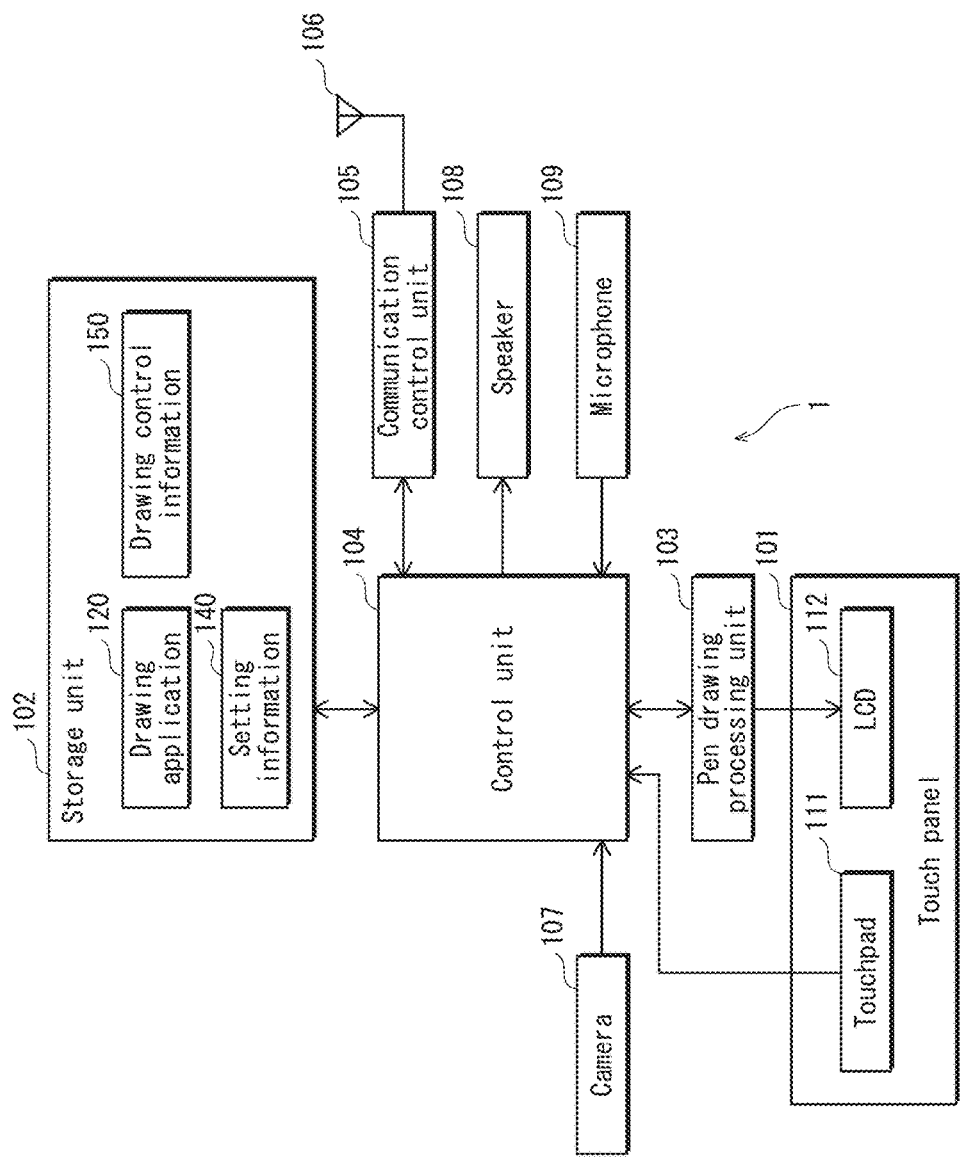
FIG. 2 is a functional block diagram of pen tablet 1.

FIG. 2 is a block diagram illustrating the functional structure of the pen tablet 1. As illustrated in FIG. 2, the pen tablet 1 includes: the touch panel 101; a storage unit 102; a pen drawing processing unit 103; a control unit 104; a communication control unit 105; an antenna 106; a camera 107; a speaker 108; and a microphone 109.

The touch panel 101 includes a touchpad 111 and a liquid crystal display (LCD) 112. The touchpad 111 is an input device and the LCD 112 is a display device.

The touchpad 111 includes a touch sensor, which may be a capacitive touch sensor, an electro-magnetic touch sensor, a resistive touch sensor, or the like. So that images displayed on the LCD 112 are made visible to the user, the touchpad 111 may be placed on top of the LCD 112 and be light-transmissive, or may be placed behind the LCD 112.

The touch panel 101 includes an undepicted controller, and detects contact between the touchpad 111 and a user's finger, the stylus pen 1a, or the like. The touch panel 101, when detecting such contact, outputs a set of an X coordinate value and a Y coordinate value (referred to in the following as a coordinate value set) indicating a contact position and a value indicating contact pressure (referred to in the following as a writing pressure value) to the control unit 104. The touch panel 101 outputs a combination of a coordinate value set and a writing pressure value each time a unit time period (e.g., one millisecond) elapses while contact is being detected.

The storage unit 102 is an external storage device, and functions as a multi-purpose memory. For example, the storage unit 102 functions as: a program storage memory; a setting value storage memory; a received mail storage memory; a photograph storage memory; and a schedule management table storage memory.

For example, as a program storage memory, the storage unit 102 stores a drawing application 120 and drawing control information 150. The drawing application 120 is a computer program for pen drawing processing. The drawing control information 150 is data used by the drawing application 120. As a setting value storage memory, the storage unit 102 stores setting information 140. The setting information 140 is used in pen drawing processing. The setting information 140 and the drawing control information 150 are described in detail later in the present disclosure.

The pen drawing processing unit 103 is implemented by using a CPU, a RAM, and a dedicated hardware circuit for pen drawing processing. The pen drawing processing unit 103 executes the drawing application 120 to perform pen drawing processing. The pen drawing processing unit 103 is described in detail later in the present disclosure.

The control unit 104 is connected to each functional block of the pen tablet 1, and has a function of controlling the entire pen tablet 1. The control unit 104 is implemented by using the CPU, the RAM, and one or more computer programs. The control unit 104 achieves various functions by the CPU executing the computer programs stored in the storage unit 102. To provide examples of functions of the control unit 104, the control unit 104 outputs combinations of a coordinate value set and a writing pressure value output from the touch panel 101 to the pen drawing processing unit 103, and controls components for outputting frame images to the touch panel 101a, such as a display circuit and a panel drive circuit.

The communication control unit 105 is implemented by using the CPU, the RAM, and one or more computer programs. The communication control unit 105 achieves a function of connecting to a communication network such as the Internet via the antenna 106 by the CPU executing the computer programs stored in the storage unit 102. Thus, the communication control unit 105 performs transmission and reception of data such as audio data, character data, image data, etc., with one or more other computers, each of which may be a personal computer, a tablet terminal, a smartphone, a portable telephone, a web server, or the like.

The camera 107 includes a CCD (charge coupled device) image sensor and a lens. The camera 107 has a function of detecting light entering from the lens by using the CCD image sensor and thereby generating an image.

The speaker 108 has a function of outputting sound. The microphone 109 has a function of collecting sound.

2-2. Setting Information 140 and Drawing Control Information 150

Figure 3:
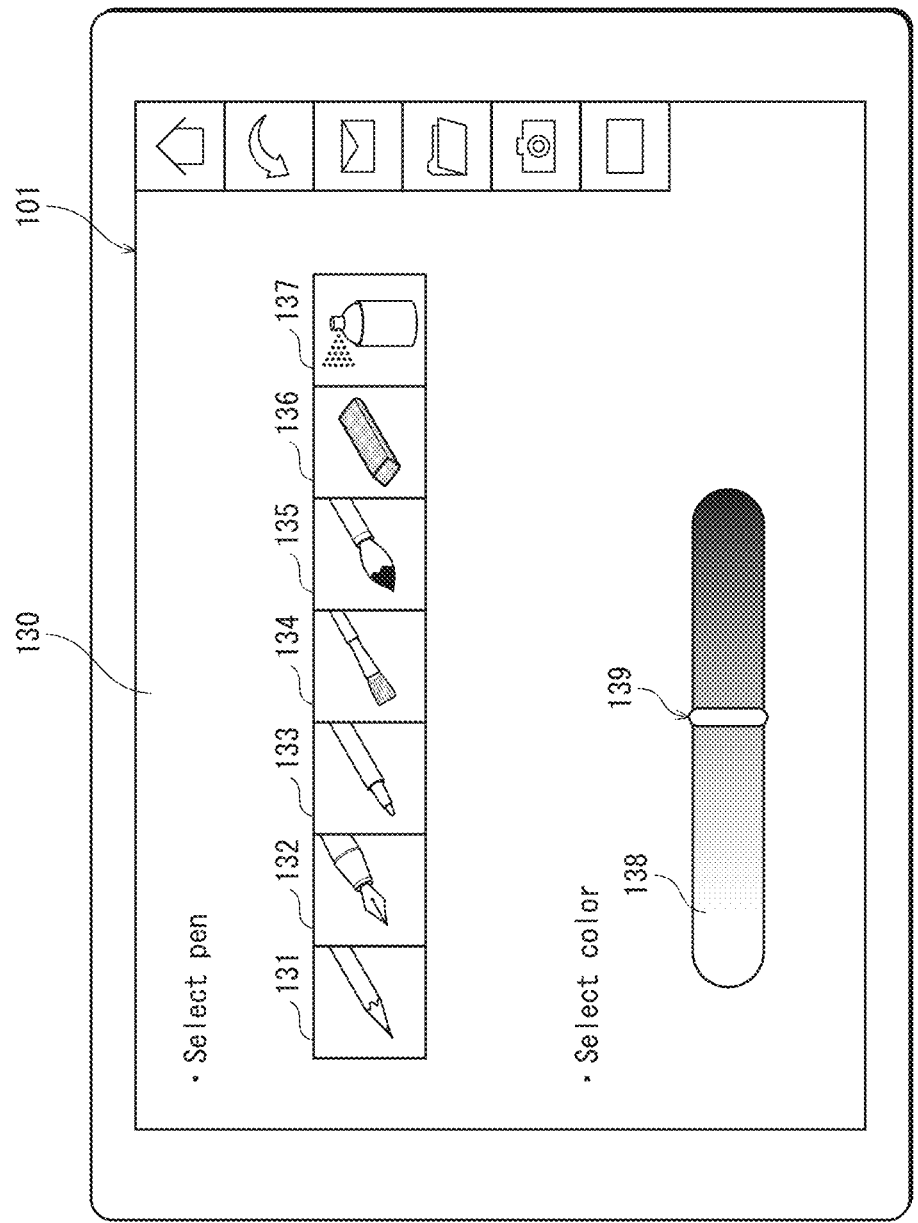
FIG. 3 is a diagram for explaining selection of pen tip and color.

The following describes the setting information 140 and the drawing control information 150, both of which are used in pen drawing processing, with reference to FIGS. 3 through 5.

The setting information 140 indicates a pen type selected by the user from among a plurality of available pen types, and a color selected from among a plurality of available colors.

When the drawing application 120 is launched, a setting screen 130 is displayed on the touch panel 101. FIG. 3 illustrates one example of the setting screen 130. The setting screen 130 illustrated in FIG. 3 includes icons 131 through 137, a color chart 138, and a selection bar 139. Each of the icons 131 through 137 corresponds to one pen type (a pencil, a fountain pen, a felt-tip pen, a paintbrush, a writing brush, a pastel, or a spray). The color chart 138 is used to make a selection of color. The selection bar 139 indicates a currently-selected position on the color chart 138, and can be moved by the user.

The user is able to select one pen type that the user would like to use in pen input by selecting one of the icons 131 through 137. Further, the user is able to select one color that the user would like to use in pen input by moving the selection bar 139 to a desired position on the color chart 138.

When the user has selected one pen type and one color, the pen drawing processing unit 103 generates the setting information 140 and stores the setting information 140 to the storage unit 102 via the control unit 104.

FIG. 4 illustrates one example of the setting information 140. Note that the present embodiment describes an example where a number (pen number) is allocated to each pen type, and the pen type that the user has selected is indicated by the pen number included in the setting information 140. As examples of the pen numbers, pen number "1" is allocated to pen type "pencil", pen number "2" is allocated to pen type "fountain pen", pen number "3" is allocated to pen type "felt-tip pen", pen number "4" is allocated to pen type "paintbrush", pen number "5" is allocated to pen type "writing brush", pen number "6" is allocated to pen type "pastel", and pen number "7" is allocated to pen type "spray". Further, in the setting information 140, the color that the user has selected is indicated by using RGB values.

In the present embodiment, description is provided based on an exemplary case where the user has selected one color on the gray scale as the color of the pen tip. Needless to say, the user is able to select any color on the full color scale as the color of the pen tip.

FIG. 5 illustrates the drawing control information 150. As illustrated in FIG. 5, the drawing control information 150 is a table that includes, for each of the seven pen types, a pen number identifying the pen type, a shape (a dot pattern) of the pen tip at a predetermined standard writing pressure value, and a mathematical expression indicating a relationship between writing pressure and pen tip size. The drawing control information 150 illustrated in FIG. 5 includes graphs in the columns for the above-described mathematical expressions indicating the relationships between writing pressure value and pen tip size. In each of the graphs, the horizontal axis indicates writing pressure, and the vertical axis indicates pen tip size. The graphs in FIG. 5 are graphical expressions of the corresponding mathematical expressions.

The setting information 140 and the drawing control information 150 are used in pen drawing processing by the pen drawing processing unit 103.

2-3. Structure and Operation of Pen Drawing Processing Unit 103

Figure 6:
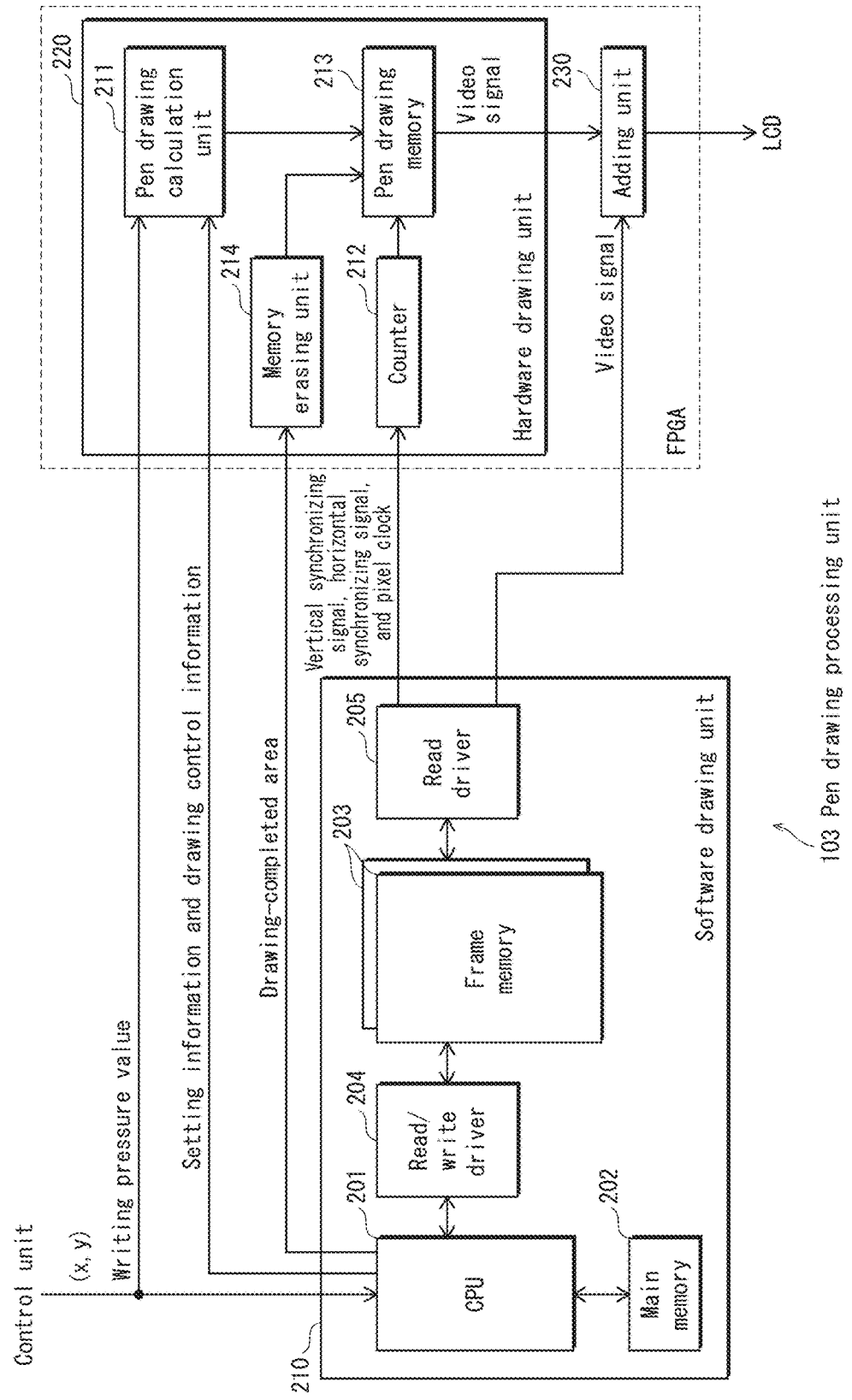
FIG. 6 illustrates the structure of pen drawing processing unit 103 in embodiment 1.

FIG. 6 is a block diagram illustrating the structure of the pen drawing processing unit 103 in detail. As illustrated in FIG. 6, the pen drawing processing unit 103 includes: a software drawing unit 210; a hardware drawing unit 220; and an adding unit 230. In the present embodiment, the software drawing unit 210 and the control unit 104 are described as separate units for the sake of explanation. However, the functions of the software drawing unit 210 may be integrated into the control unit 104.

(Structure of Software Drawing Unit 210)

The software drawing unit 210 includes: a CPU 201; a main memory 202; a frame memory 203; a read/write driver 204; and a read driver 205.

The CPU 201 is an arithmetic processor that executes the drawing application 120 to perform arithmetic calculation of various types.

The CPU 201 loads the setting information 140 and the drawing control information 150 that are stored in the storage unit 102 into the main memory 202. The CPU 201 acquires tone (i.e., the color specified in the setting information), and extracts, from the drawing control information, a combination of a pen tip shape and a mathematical expression that correspond to the pen number included in the setting information. Further, the CPU 201 outputs the information so extracted to the hardware drawing unit 220.

When receiving input of coordinate value sets and writing pressure values, the CPU 201 executes pen drawing processing by using the main memory 202 and the frame memory 203. Here, pen drawing processing executed by the CPU 201 includes generating an image corresponding to one frame, when displayed, by compositing a pen drawing image and a background image, and storing the composite image so generated to the frame memory 203. Here, when the background image is included in the drawing application 120 or is stored in the frame memory 203, the CPU 201 need not acquire the background image from an external source. Meanwhile, when using an image captured by the camera 107 or an image stored in the storage unit 102 as the background image, the CPU 201 receives input of the background image from an external source.

The description in the following is based on one specific example where, when the touch panel 101 is refreshed at a refresh cycle of 60 Hz, the CPU 201 is capable of updating the contents of the frame memory 203 by approximately one-third (⅓) of one frame within a time period (approximately 16.7 milliseconds) required for refreshing a screen corresponding to one frame. The updating is performed starting from the top of the frame memory 203 and ending at the bottom of the frame memory 203.

Figure 7:
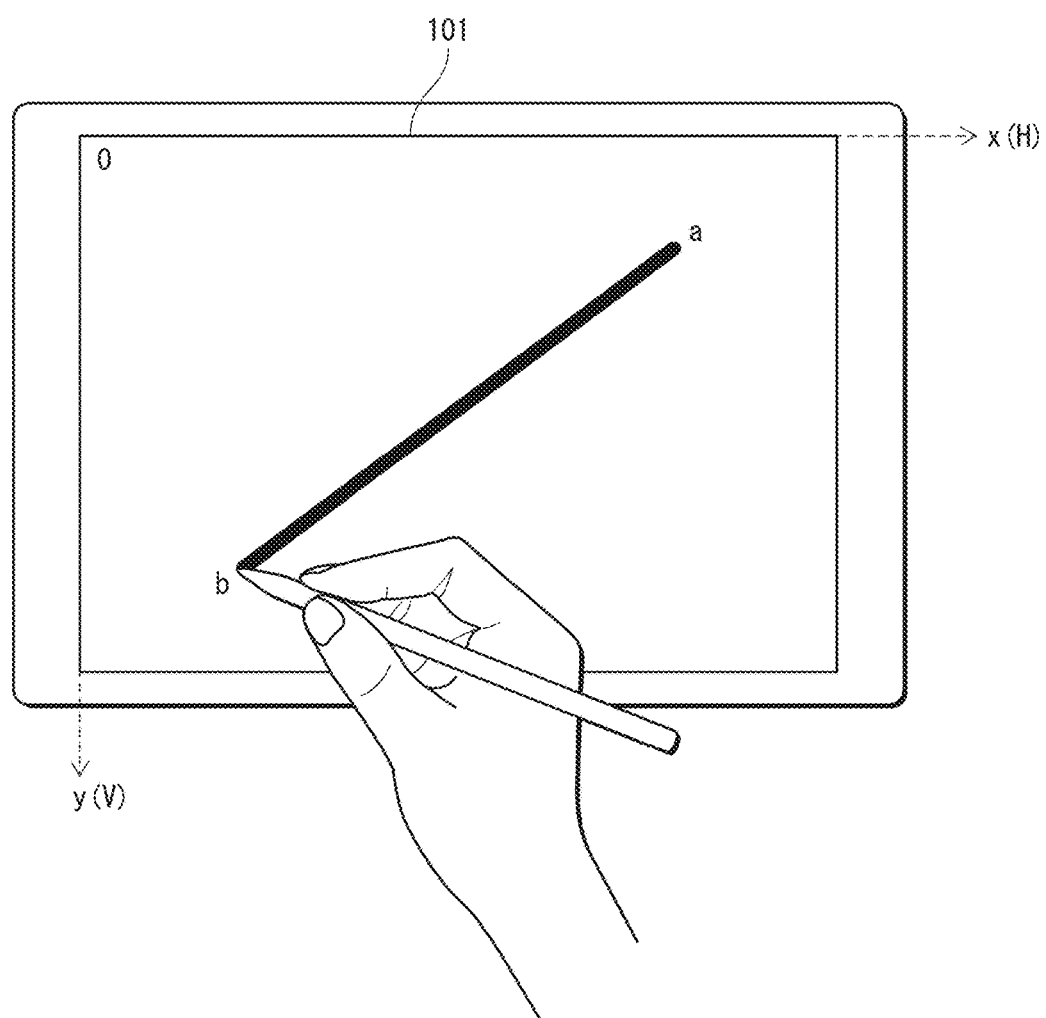
FIG. 7 is a diagram for explaining user input.

For example, consider a case where the user performs high-speed pen input, from a point on the touch panel 101 indicated by "a" to a point on the touch panel 101 indicated by "b", as illustrated in FIG. 7. Among two memory areas of the frame memory 203, the software drawing unit 210 exchanges the one used for reading data and the one used for writing data, as described in detail later in the present disclosure. Thus, before the pen drawing processing by the CPU 201 is completed, the touch panel 101 is refreshed six times, as illustrated in portion (b) of FIG. 10.

The CPU 201 constantly outputs a piece of information indicating an area with respect to which the pen drawing processing has been completed to a later-described memory erasing unit 214. This piece of information is referred to in the following as a drawing-completed area. For example, the drawing-completed area may be indicated by using a set of a frame number, a line number at which updating started, and a line number at which updating ended. In the following, a line number at which updating started, or that is the line number at the top of the area with respect to which the drawing processing has been completed, is referred to as an "update start line number", and a line number at which updating ended, or that is the line number at the bottom of the area with respect to which the drawing processing has been completed, is referred to as an "update end line number".

The frame memory 203 is a data accumulation unit with respect to which the writing and reading of images is performed, and is implemented by using a RAM. The frame memory 203 has two memory areas each corresponding to one access port and having the capacity for storing data corresponding to an image corresponding to one frame, when displayed.

The read/write driver 204 operates in accordance with instructions provided from the CPU 201. The read/write driver 204 reads images from and writes images to the frame memory 203.

The read driver 205 is driven by an undepicted display circuit. The read driver 205 reads pixel signals one after another from the frame memory 203, and inputs the pixel signals to the adding unit 230. In addition, the read driver 205, while inputting pixel signals to the adding unit 230, inputs timing signals to the hardware drawing unit 220. The timing signals each include a vertical synchronizing signal, a horizontal synchronizing signal, and a pixel clock. Note that in the specification and the drawings, a signal representing one pixel is referred to as a "pixel signal", and a sequence of continuous pixel signals is referred to as a "video signal".

Here, note that the read/write driver 204 and the read driver 205 each use a different one of the two memory areas of the frame memory 203 for processing a given frame. Further, the memory areas that the read/write driver 204 and the read driver 205 use are exchanged when processing proceeds to a subsequent frame. That is, while the display circuit is performing image reading by using one memory area via the read driver 205, the CPU 201 is able to perform image updating by using the other memory area via the read/write driver 204.

(Operations of Software Drawing Unit 210)

Figure 8:
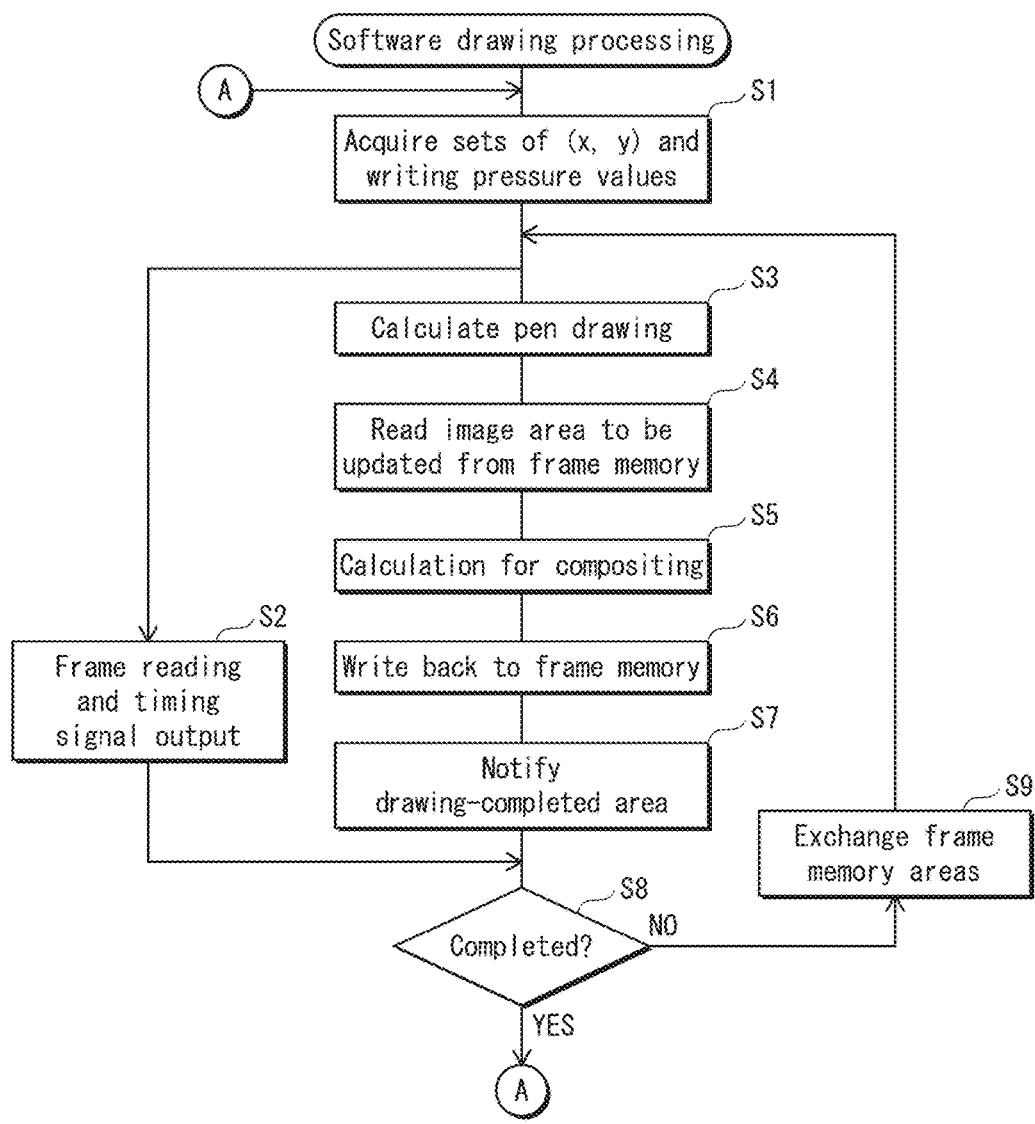
FIG. 8 is a flowchart of pen drawing processing in embodiment 1.

FIG. 8 is a flowchart illustrating pen drawing processing performed by the software drawing unit 210. Note that at the point when this processing is commenced, the setting information and the drawing control information have already been loaded into the main memory 202.

The CPU 201 receives input of a plurality of combinations of a coordinate value set and a writing pressure value one after another (Step S1). In the following, description is provided based on an exemplary case where the CPU 201 receives input of combinations of a coordinate value set and a writing pressure value that are detected during one stroke, i.e., during a period from when contact made by the stylus pen 1a is first detected until when the contact is no longer detected.

The read driver 205 outputs timing signals while reading out pixel signals from the frame memory 203 (Step S2). The pixel signals are input to the adding unit 230, and the timing signals are input to a counter 212.

While the read driver 205 is executing the processing in Step S2, the CPU 201 executes the sequence of processing including Steps S3 through S7.

First, the CPU 201 generates a pen drawing image by performing calculation by using some of the coordinate value sets acquired in Step S1, some of the writing pressure values acquired in Step S1, and the setting information and the drawing control information stored in the main memory 202 (Step S3). In specific, the CPU 201 extracts, from the drawing control information, a combination of a standard pen tip shape and a mathematical expression that are associated with a pen number matching the pen number included in the setting information. With respect to each combination of a coordinate value set and a writing pressure value, the CPU 201 compares the extracted information with the writing pressure value, and calculates a dot pattern in accordance with the writing pressure value around a center point indicated by the coordinate value set. Further, the CPU 201 generates a pen drawing image, which expresses dot patterns so calculated in the tone included in the setting information.

Subsequently, the CPU 201 reads out, from the frame memory 203, an image corresponding to an area to be updated (Step S4). Note that the processing in Step S4 may be skipped when an image stored in the frame memory 203 is not necessary for calculation to be performed in composition with the pen drawing image. Further, when a work memory other than the frame memory 203 is included, an image of the area to be updated may be read from the work memory.

Following this, the CPU 201 either composites the pen drawing image with the image read in Step S4, or composites the pen drawing image with a background image input from an external source (Step S5). Then, the CPU 201 writes back the composite image into the frame memory 203 (Step S6). Subsequently, the CPU 201 notifies a drawing-completed area to the memory erasing unit 214 (Step S7).

When the calculation of a pen drawing image and writing/reading with respect to the frame memory 203 has not been completed by using all coordinate value sets acquired in Step S1 (NO in Step S8), the CPU 201 exchanges the memory area allocated to image reading and the memory area allocated to image writing (Step S9). Subsequently, processing returns to Steps S2 and S3, from which processing is continued.

When the calculation of a pen drawing image and writing/reading with respect to the frame memory 203 has been performed by using all coordinate value sets acquired in Step S1 (YES in Step S8), the software drawing unit 210 returns to the processing in Step S1, and executes pen drawing processing for a subsequent stroke.

(Hardware Drawing Unit 220)

Figure 9:
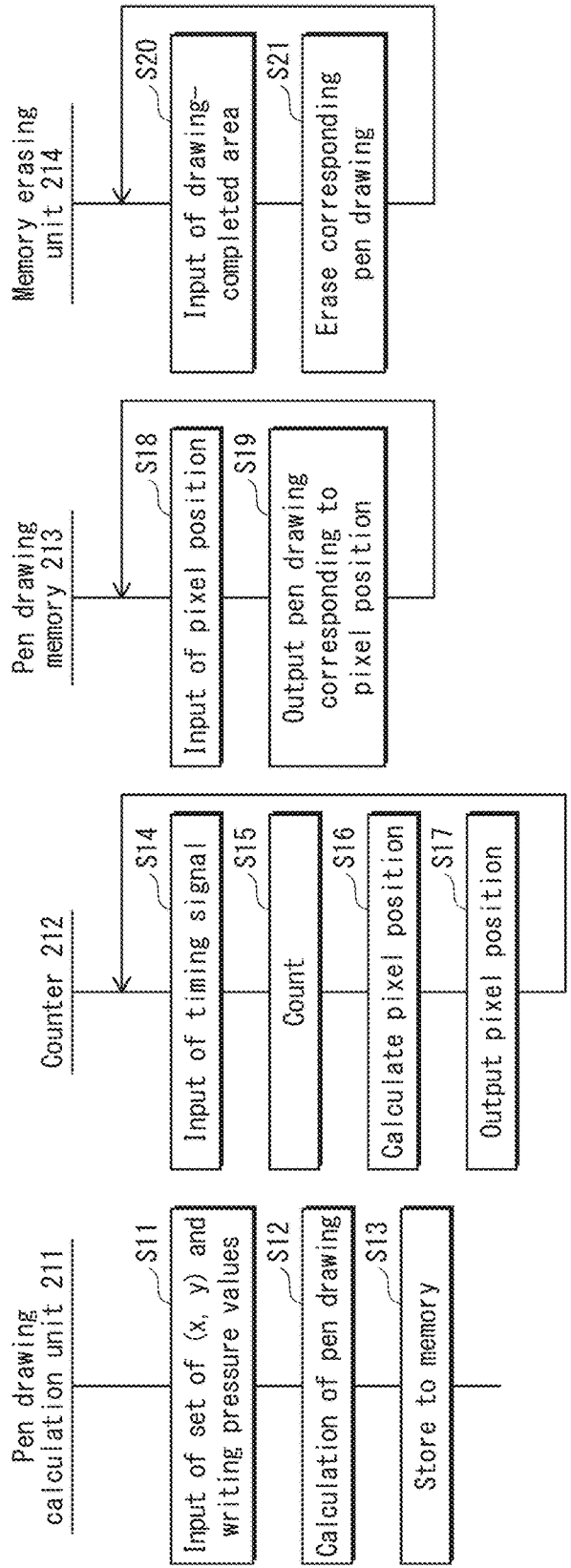
FIG. 9A illustrates processing by pen drawing calculation unit 211 of hardware drawing unit 220 in embodiment 1.
FIG. 9B illustrates processing by counter 212 in hardware drawing unit 220 in embodiment 1.
FIG. 9C illustrates processing by pen drawing memory 213 in hardware drawing unit 220 in embodiment 1.
FIG. 9D illustrates processing by memory erasing unit 214 in hardware drawing unit 220 in embodiment 1.

The following describes the hardware drawing unit 220, with reference to FIGS. 6 and 9. FIG. 9 illustrates processing performed by each constituent element of the hardware drawing unit 220.

As illustrated in FIG. 6, the hardware drawing unit 220 includes: a pen drawing calculation unit 211; the counter 212; a pen drawing memory 213; and the memory erasing unit 214. The hardware drawing unit 220 is a dedicated hardware for pen drawing processing. The hardware drawing unit 220 may be implemented by using a field-programmable gate array (FPGA).

The pen drawing calculation unit 211 receives, from the CPU 201, a specification of a pen drawing tone, a standard pen tip shape, and a mathematical expression indicating a relationship between writing pressure and pen tip size.

As illustrated in FIG. 9A, the pen drawing calculation unit 211 receives, one after another, combinations of a coordinate value set and a writing pressure value from the control unit 104 (Step S11). The pen drawing calculation unit 211 calculates a pen drawing for each coordinate value set that is input (Step S12). In specific, with respect to each combination of a coordinate value set and a writing pressure value, the pen drawing calculation unit 211 compares the writing pressure value with the standard pen tip shape and the mathematical expression, and calculates a dot pattern in accordance with the writing pressure value around a center point indicated by the coordinate value set. Further, the pen drawing calculation unit 211 generates a pen drawing image, which expresses the dot pattern so calculated in the tone included in the setting information, and stores the pen drawing image so generated to the pen drawing memory 213 (Step S13).

As illustrated in FIG. 9B, the counter 212 receives timing signals from the read driver 205 of the software drawing unit 210 (Step S14). The timing signals each include a vertical synchronizing signal, a horizontal synchronizing signal, and a pixel clock. The counter 212 counts the pixel clock, counts a line number based on the vertical synchronizing signal and the horizontal synchronizing signal (Step S15), and calculates a pixel position in the video signal output from the frame memory 203 (Step S16). The counter 212 outputs the calculated pixel position to the pen drawing memory 213 (Step S17).

While the read driver 205 of the software drawing unit 210 is reading out a frame image to be displayed from the frame memory 203, the counter 212 continuously receives input of timing signals from the read driver 205. Due to this, the counter 212 repeatedly performs the sequence of processing including Steps S14 through S17.

Further, the counter 212 counts a frame number based on the vertical synchronizing signal and the horizontal synchronizing signal. As described later in the present disclosure, the frame number, the line number, and the pixel number that are counted by the counter 212 may be used as time information.

The pen drawing memory 213 is a memory area (RAM) of relatively small size that is included within the FPGA. The pen drawing memory 213 stores pen drawing images (a pattern formed by X coordinates and Y coordinates) that are output from the pen drawing calculation unit 211 along with time information for each of the pen drawing images. The time information of a pen drawing image indicates either the time point at which the pen drawing image was output, or the position of the pen drawing image in a sequential order in which pen drawing images are output.

Note that when using the time point at which a pen drawing image was output to the pen drawing memory 213 as the time information, a value that is measured by an undepicted clock may be used to indicate the time point, or a set of a frame number, a line number, and a pixel number counted by the counter unit 212 may be used to indicate the time point. Alternatively, when using the position of a pen drawing image in the sequential order in which pen drawing images are output to the pen drawing memory 213 as the time information, an incremented value starting from one may be used to indicate the position. The time information is used to identify each pen drawing image when pen drawing processing is performed continuously and a plurality of pen drawing images are stored to the pen drawing memory 213.

As illustrated in FIG. 9C, the pen drawing memory 213 receives input of a pixel position from the counter 212 (Step S18). The pen drawing memory 213 outputs a pixel signal of a pen drawing image corresponding to the pixel position so input (Step S19).

While the read driver 205 of the software drawing unit 210 is reading a frame image to be displayed from the frame memory 203, the pen drawing memory 213 receives input of pixel positions from the counter 212. Due to this, the pen drawing memory 213 repeatedly performs the sequence of processing including Step S18 and S19.

As illustrated in FIG. 9D, the memory erasing unit 214 receives input of a drawing-completed area from the CPU 201 (Step S20). The memory erasing unit 214 deletes pen drawing images corresponding to the drawing-completed area from the pen drawing memory 213 (Step S21). While the CPU 201 is performing pen drawing processing, the memory erasing unit 214 repeatedly performs the sequence of processing including Steps S20 and S21.

The hardware drawing unit 220 performs pen drawing processing at a higher speed than the software drawing unit 210. As illustrated in portion (a) of FIG. 10, the hardware drawing unit 220 is capable of outputting an entirety of a line drawn by a user through pen drawing before the software drawing unit 210 outputs the first pen drawing image.

(Adding Unit 230)

The adding unit 230 performs, pixel by pixel, adding of the video signal generated by the software drawing unit 210 and the video signal generated by the hardware drawing unit 220. The adding unit 230 outputs a video signal obtained through the adding to the undepicted panel drive circuit.

As already described above, the hardware drawing unit 220 outputs pen drawing images, each at an appropriate timing, through the timing control. Thus, the adding unit 230 is able to composite a pen drawing image generated by the hardware drawing unit 220 with respect to an appropriate position in a frame image.

(Example of Display by Touch Panel 101)

As description has been provided up to this point, in the pen tablet 1 pertaining to embodiment 1, the software drawing unit 210 notifies the hardware drawing unit 220 of the drawing-completed area. Meanwhile, the hardware drawing unit 220 deletes pen drawing images corresponding to the drawing-completed area so notified from the pen drawing memory 213.

Figure 10:
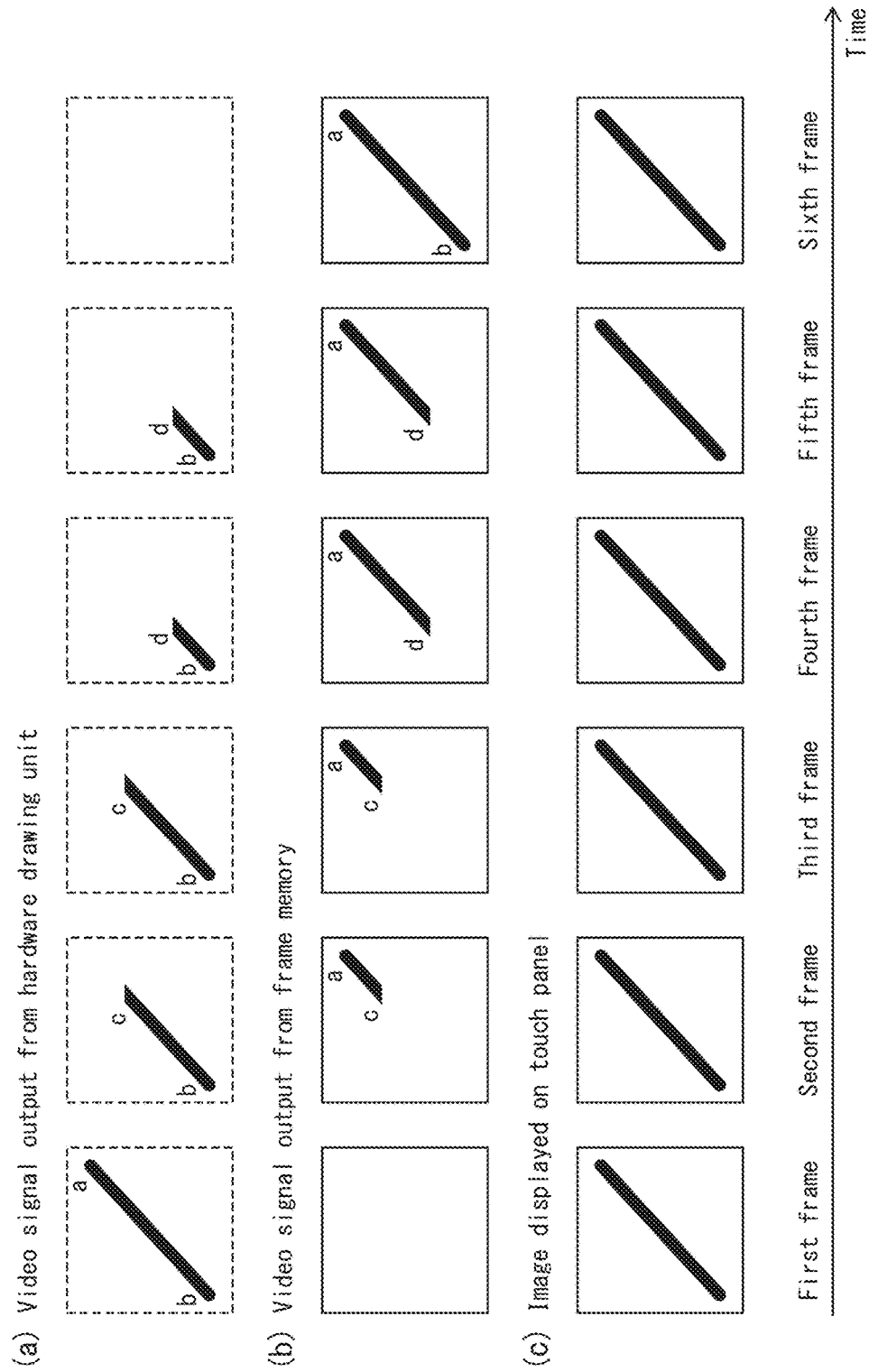
FIG. 10 includes portions (a), (b), and (c) for explaining images displayed on touch panel 101 in embodiment 1.

Due to this, as illustrated in portion (b) of FIG. 10, the software drawing unit 210, in pen drawing processing, processes a frame part by part by processing one-third (⅓) of a frame at a time, whereas the hardware drawing unit 220, in pen drawing processing, outputs a video signal corresponding to a part of the frame with respect to which the software drawing unit 210 has not yet performed pen drawing processing.

The adding unit 230 composites a video signal output from the software drawing unit 210 and a video signal output from the hardware drawing unit 220, and outputs the result of the compositing to the panel drive circuit. The panel drive circuit drives a driver connected to a source line, a gate line, and the like of the touch panel 101, based on the video signal so input. Accordingly, as illustrated in portion (c) of FIG. 10, the touch panel 101 is capable of displaying the entirety of a pen drawing immediately following the completion of the pen input by the user. From this point on, the touch panel 101 displays pen drawing images in the color specified by the user, until pen drawing processing by the software drawing unit 210 is completed.

3. Embodiment 2

The following describes a second embodiment of an information input/display device pertaining to one aspect of the present disclosure.

Embodiment 2 describes a pen tablet similar to that described above in that composition is performed of a frame image generated through software processing and a pen drawing image generated by a hardware circuit. Meanwhile, the pen tablet pertaining to embodiment 2 adjusts tone at a pen drawing portion where the frame image and the pen drawing image overlap one another.

The pen tablet pertaining to embodiment 2 has the same exterior appearance and the same functional blocks as the pen tablet 1 pertaining to embodiment 1. Thus, the external appearance of the pen tablet pertaining to embodiment 2 is illustrated in FIG. 1, and the functional blocks of the pen tablet pertaining to embodiment 2 are illustrated in FIG. 2. However, the pen drawing processing unit in the pen tablet pertaining to embodiment 2 has functions differing from those of the pen drawing processing unit 103 in the pen tablet 1.

Figure 11:
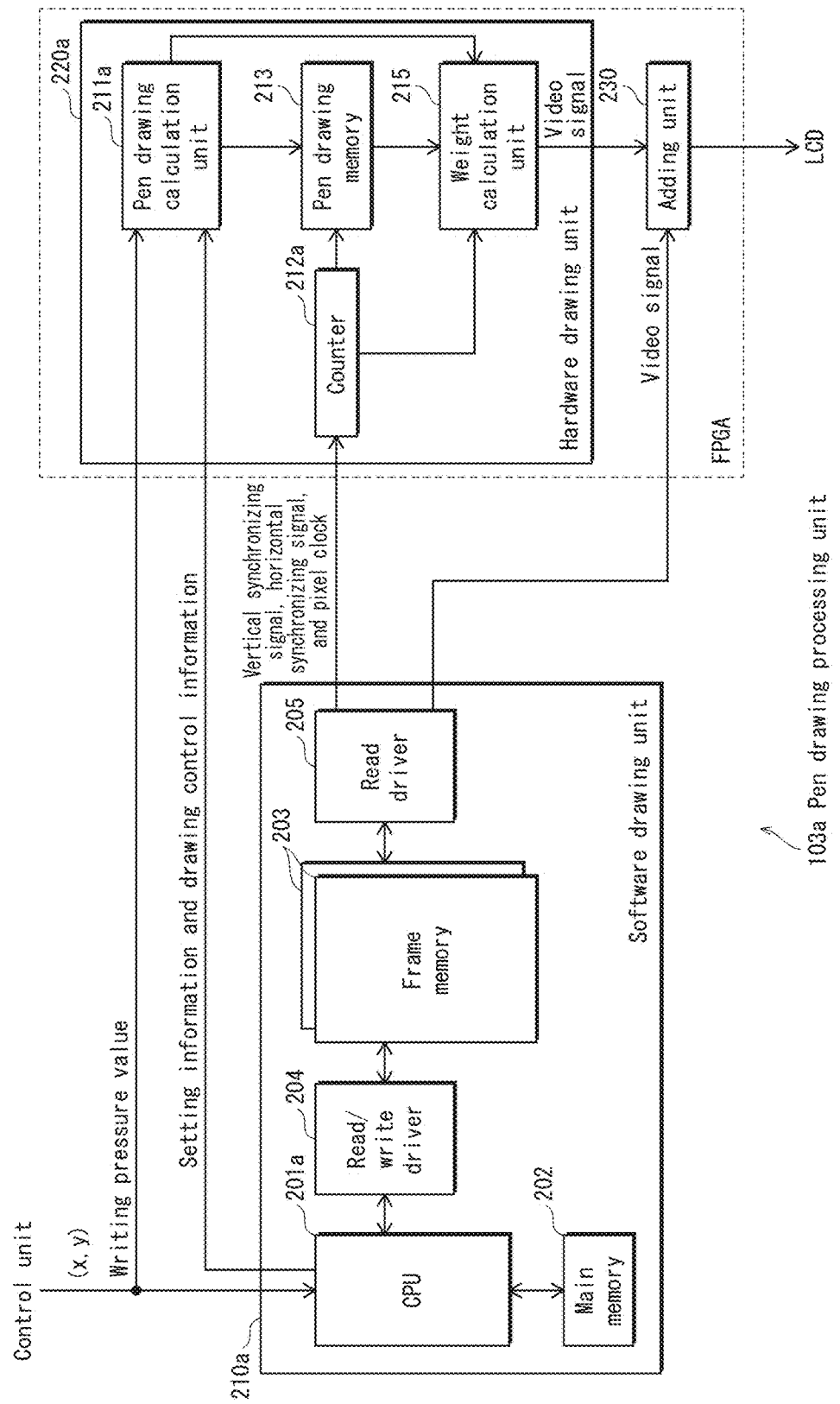
FIG. 11 illustrates the structure of pen drawing processing unit 103a in embodiment 2.

FIG. 11 is a block diagram illustrating the structure of a pen drawing processing unit 103a in the pen tablet pertaining to embodiment 2 in detail. As illustrated in FIG. 11, the pen drawing processing unit 103a includes: a software drawing unit 210a; a hardware drawing unit 220a; and the adding unit 230.

(Structure of Software Drawing Unit 210a)

The software drawing unit 210a includes: a CPU 201a; the main memory 202; the frame memory 203; the read/write driver 204; and the read driver 205.

The main memory 202, the frame memory 203, the read/write driver 204, and the read driver 205 have already been described in embodiment 1. The functions of the CPU 201a differ in part from those of the CPU 201 in embodiment 1.

In embodiment 1, the CPU 201 constantly outputs drawing-completed areas to the hardware drawing unit 220. Further, the CPU 201 generates pen drawing images in the tone specified in the setting information.

Differing from the CPU 201, the CPU 201*a* does not have the function of notifying drawing-completed areas to the hardware drawing unit 220*a*. Further, the CPU 201*a* has a function of gradually changing the tone of pen drawing images from light to dark, by gradually changing weight applied to the tone specified in the setting information. The rest of the functions of the CPU 201*a* are similar to those of the CPU 201.

(Operations in Software Drawing Processing)

Figure 12:
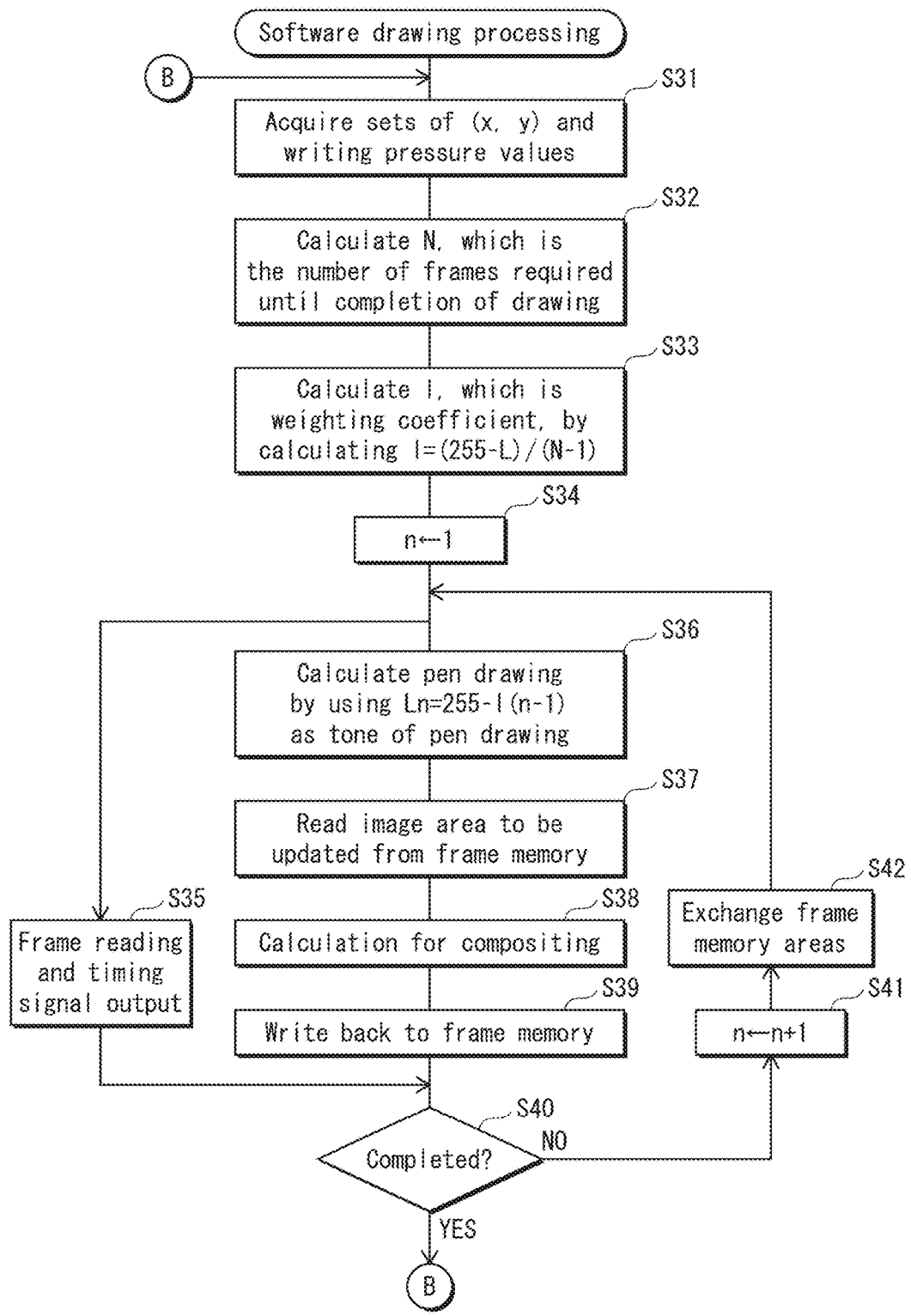
FIG. 12 is a flowchart of pen drawing processing in embodiment 2.

FIG. 12 is a flowchart indicating the flow of processing performed by the software drawing unit 210*a*. Note that at the point when the processing performed by the software drawing unit 210*a* is commenced, the setting information and the drawing control information have already been loaded into the main memory 202.

The CPU 201*a* receives input of a plurality of combinations of a coordinate value set and a writing pressure value one after another (Step S31). In the following, description is provided based on an exemplary case where the CPU 201*a* receives input of combinations of a coordinate value set and a writing pressure value that are detected during one stroke, i.e., during a period from when contact made by the stylus pen 1*a* is first detected until when the contact is no longer detected.

The CPU 201*a*, based on the coordinate value sets acquired in Step S31, calculates N, which indicates the number of frames required until the completion of pen drawing processing (i.e., the number of frames to be displayed on the touch panel 101 until the completion of pen drawing processing). Subsequently, the CPU 201*a* calculates l, which is a weighting coefficient and calculated as l=(255−L)/(N−1) (Step S33). Here, L denotes the tone (luminance value) specified in the setting information. For example, given N=6 and L=150, l=21.

The CPU 201*a* stores one (1) as n, which indicates a frame currently being processed (current frame number).

The read driver 205 outputs timing signals while reading out pixel signals from the frame memory 203 (Step S35). The pixel signals are input to the adding unit 230, and the timing signals are input to a counter 212*a*.

While the read driver 205 is executing the processing in Step S35, the CPU 201*a* executes the sequence of processing including Steps S26 through S29.

First, the CPU 201*a* calculates Ln, which is a tone of a pen drawing image to be generated, by calculating Ln=255−l(n−1). In the following, description is provided based on an exemplary case where the color of the background image is white, and the tone of the pen drawing images generated by the CPU 201*a* becomes gradually darker starting from the color white and until finally reaching the color gray with the tone L specified by the user.

Following the calculation of the tone Ln, the CPU 201*a* generates a pen drawing image by performing calculation by using some of the coordinate value sets acquired in Step S1, some of the writing pressure values acquired in Step S1, and the setting information and the drawing control information stored in the main memory 202 (Step S36). In specific, the CPU 201*a* extracts, from the drawing control information, a combination of a standard pen tip shape and a mathematical expression that are associated with a pen number matching the pen number included in the setting information. With respect to each combination of coordinate value set and writing pressure value, the CPU 201 compares the extracted information with the writing pressure value, and calculates a dot pattern in accordance with the writing pressure value around a center point indicated by the coordinate value set. Further, the CPU 201*a* generates a pen drawing image, which expresses dot patterns so calculated in the tone Ln having been calculated.

Subsequently, the CPU 201*a* reads out, from the frame memory 203, an image corresponding to an area to be updated (Step S37). Note that the processing in Step S37 may be skipped when an image stored in the frame memory 203 is not necessary for composition with the pen drawing image.

Following this, the CPU 201*a* either composites the pen drawing image with the image read in Step S37, or composites the pen drawing image with a background image input from an external source (Step S38). Then, the CPU 201*a* writes back the composite image into the frame memory 203 (Step S39).

When the calculation of pen drawing images and writing/reading with respect to the frame memory 203 has not been completed by using all coordinate value sets acquired in Step S31 (NO in Step S40), or that is, when n<N, the CPU 201*a* increments the current frame number n by 1 (i.e., replaces n with n+1)(Step S41). Subsequently, the CPU 201*a* exchanges the memory area allocated to image reading and the memory area allocated to image writing (Step S42). Subsequently, processing returns to Steps S35 and S36, from which processing is continued.

When the calculation of pen drawing images and writing/reading with respect to the frame memory 203 has been performed by using all coordinate value sets acquired in Step S31 (YES in Step S40), the software drawing unit 210*a* returns to the processing in Step S31, and executes pen drawing processing for a subsequent stroke.

As described above, the software drawing unit 210*a* performs pen drawing processing by exchanging the memory area allocated to image reading and the memory area allocated to image writing and by gradually changing the tone of pen drawing images according to a predetermined algorithm. Due to this, when video signals output from the frame memory 203 are displayed, a line drawn by a user through pen drawing is displayed gradually while tone gradually becomes darker, as illustrated in portion (b) of FIG. 14.

(Hardware Drawing Unit 220*a*)

The following describes a hardware drawing unit 220*a*, with reference to FIGS. 11 and 13. FIG. 13 illustrates processing performed by each constituent element of the hardware drawing unit 220*a*.

As illustrated in FIG. 11, the hardware drawing unit 220*a* includes: a pen drawing calculation unit 211*a*; the counter 212*a*; the pen drawing memory 213; and a weight calculation unit 215. The hardware drawing unit 220*a* is dedicated hardware for pen drawing processing.

The pen drawing memory 213 has already been described in embodiment 1. The pen drawing calculation unit 211*a* and the counter 212*a* have functions partially differing from those of the pen drawing calculation unit 211 and the counter 212, respectively. Further, the hardware drawing unit 220*a* does not include the memory clearing unit 214, and includes the weight calculation unit 215.

The pen drawing calculation unit 211*a* receives, from the CPU 201*a*, a specification of a pen drawing tone, a standard pen tip shape, and a mathematical expression indicating a relationship between writing pressure value and pen tip size.

Figure 13C:
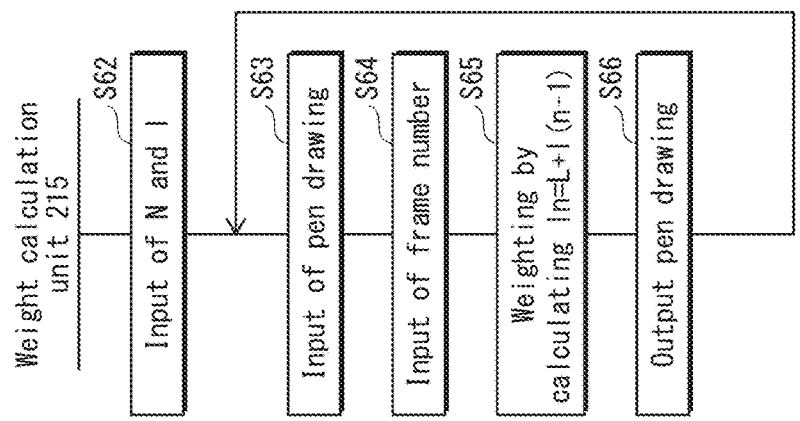
FIG. 13C illustrates processing by weight calculation unit 215 in hardware drawing unit 220a in embodiment 2.
Figure 13B:
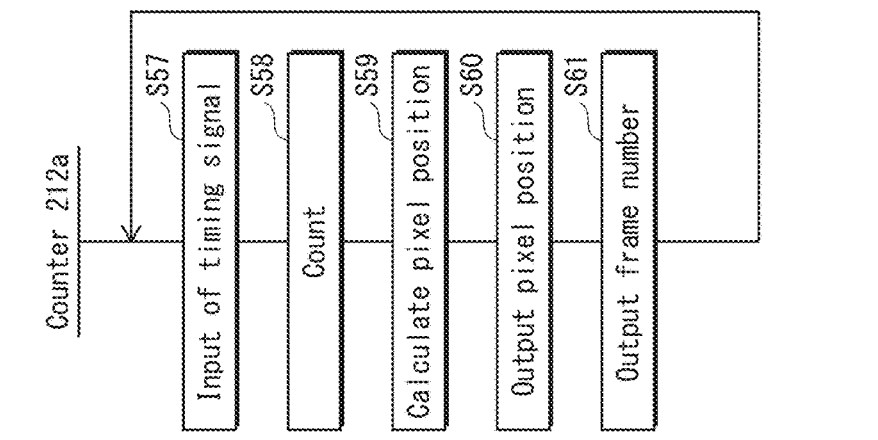
FIG. 13B illustrates processing by counter 212a in hardware drawing unit 220a in embodiment 2.
Figure 13A:
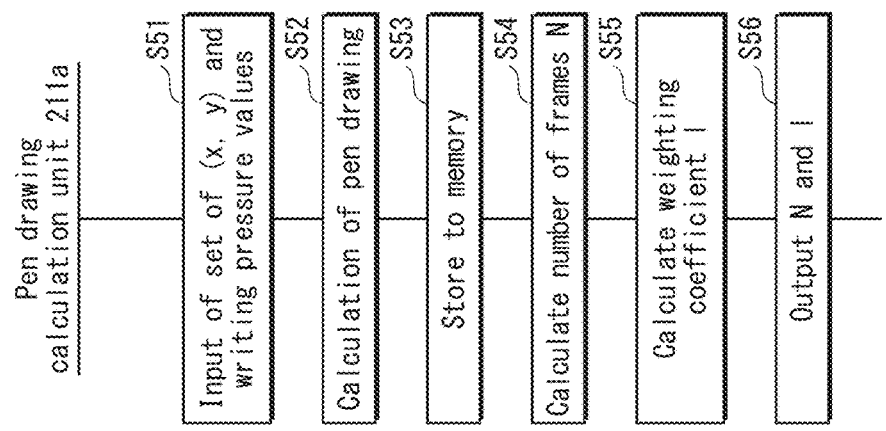
FIG. 13A illustrates processing by pen drawing calculation unit 211a of hardware drawing unit 220a in embodiment 2.

As illustrated in FIG. 13A, the pen drawing calculation unit 211*a* receives, one after another, combinations of a coordinate value set and a writing pressure value from the control unit 104 (Step S51). The pen drawing calculation unit 211a calculates a pen drawing image for each coordinate value set that is input (Step S52). In specific, with respect to each combination of a coordinate value set and a writing pressure value, the pen drawing calculation unit 211a compares the writing pressure value with the standard pen tip shape and the mathematical expression, and calculates a dot pattern in accordance with the writing pressure value around a center point indicated by the coordinate value set. Further, the pen drawing calculation unit 211a generates a pen drawing image, which expresses the dot pattern so calculated in the tone included in the setting information, and stores the pen drawing image so generated to the pen drawing memory 213 (Step S53).

The pen drawing calculation unit 211a, based on the input coordinate set values, calculates N, which indicates the number of frames required until the completion of pen drawing processing by the software drawing unit 210a. Further, based on the number of frames so calculated, the pen drawing calculation unit 211a calculates l, which is calculated as $l=(255-L)/(N-1)$ (Step S33) and is a weighting coefficient to be used by the weight calculation unit 215 (Step S55). Here, L is the tone of pen drawing notified from the CPU 201a. The pen drawing calculation unit 211a outputs the number of frames N and the weighting coefficient l to the weight calculation unit 215 (Step S56).

As illustrated in FIG. 13B, the counter 212a receives timing signals from the read driver 205 of the software drawing unit 210a (Step S57). The timing signals each include a vertical synchronizing signal, a horizontal synchronizing signal, and a pixel clock. The counter 212a counts the pixel clock, and counts a line number and a frame number based on the vertical synchronizing signal and the horizontal synchronizing signal (Step S58). Further, the counter 212 calculates a pixel position in the video signal output from the frame memory 203, based on the pixel number and the line number (Step S59). The counter 212a outputs the calculated pixel position to the pen drawing memory 213 (Step S60). In addition, the counter 212a outputs the counted frame number to the weight calculation unit 215 (Step S61).

While the read driver 205 of the software drawing unit 210a is reading out a frame image to be displayed from the frame memory 203, the counter 212a receives input of timing signals from the read driver 205. Due to this, the counter 212a repeatedly performs the sequence of processing including Steps S57 through S61.

As illustrated in FIG. 13C, the weight calculation unit 215 receives, from the pen drawing calculation unit 211a, input of the number of frames N required until the completion of pen drawing by the software drawing unit 210a and the weighting coefficient/(Step S62).

The weight calculation unit 215, when receiving input of pen drawing images from the pen drawing memory 213 (Step S64), provides weights to the luminance of the pen drawing images by using the frame number n input from the counter 212a, and the weighting coefficient l (Step S65). Further, the weight calculation unit 215 outputs pen drawing tone, which is calculated as $ln=L+1(n-1)$ (Step S66). Here, description is provided on an exemplary case where the tone of pen drawing images output from the hardware drawing unit 220a becomes gradually lighter starting from the color gray with the tone L specified by the user and until finally reaching the color white.

(Example of Display by Touch Panel 101)

As described up to this point, the software drawing unit 210a in the pen tablet in embodiment 2 uses a predetermined algorithm that gradually darkens pen drawing tone as time elapses in pen drawing processing, as illustrated in portion (b) of FIG. 14. Meanwhile, the hardware drawing unit 220a uses a predetermined algorithm that gradually lightens pen drawing tone as time elapses in pen drawing processing, as illustrated in portion (a) of FIG. 14.

By the video signal output from the software drawing unit 210a and the video signal output from the hardware drawing unit 220a being output to the panel drive circuit after being added together by the adding unit 230, the entirety of a pen drawing is displayed on the touch panel 101 immediately following the completion of the pen input by the user, as illustrated in portion (c) of FIG. 14. In addition, providing weight to images to be displayed by using a predetermined algorithm and thereby changing the tone of the images to be displayed prevents images having a tone exceeding the tone specified by the user from being displayed.

4. Embodiment 3

The following describes a third embodiment of an information input/display device pertaining to one aspect of the present disclosure.

Embodiment 3 describes a pen tablet similar to that described above in that composition is performed of a frame image generated through software processing and a pen drawing image generated by a hardware circuit. Meanwhile, the pen tablet pertaining to embodiment 3 controls output timing such that the frame image and the pen drawing image do not overlap with one another.

The pen tablet pertaining to embodiment 3 has the same exterior appearance and the same functional blocks as the pen tablet 1 pertaining to embodiment 1. Thus, the external appearance of the pen tablet pertaining to embodiment 3 is illustrated in FIG. 1, and the functional blocks of the pen tablet pertaining to embodiment 3 are illustrated in FIG. 2. However, the pen drawing processing unit in the pen tablet pertaining to embodiment 3 has functions differing from those of the pen drawing processing unit 103 in the pen tablet 1.

Figure 15:
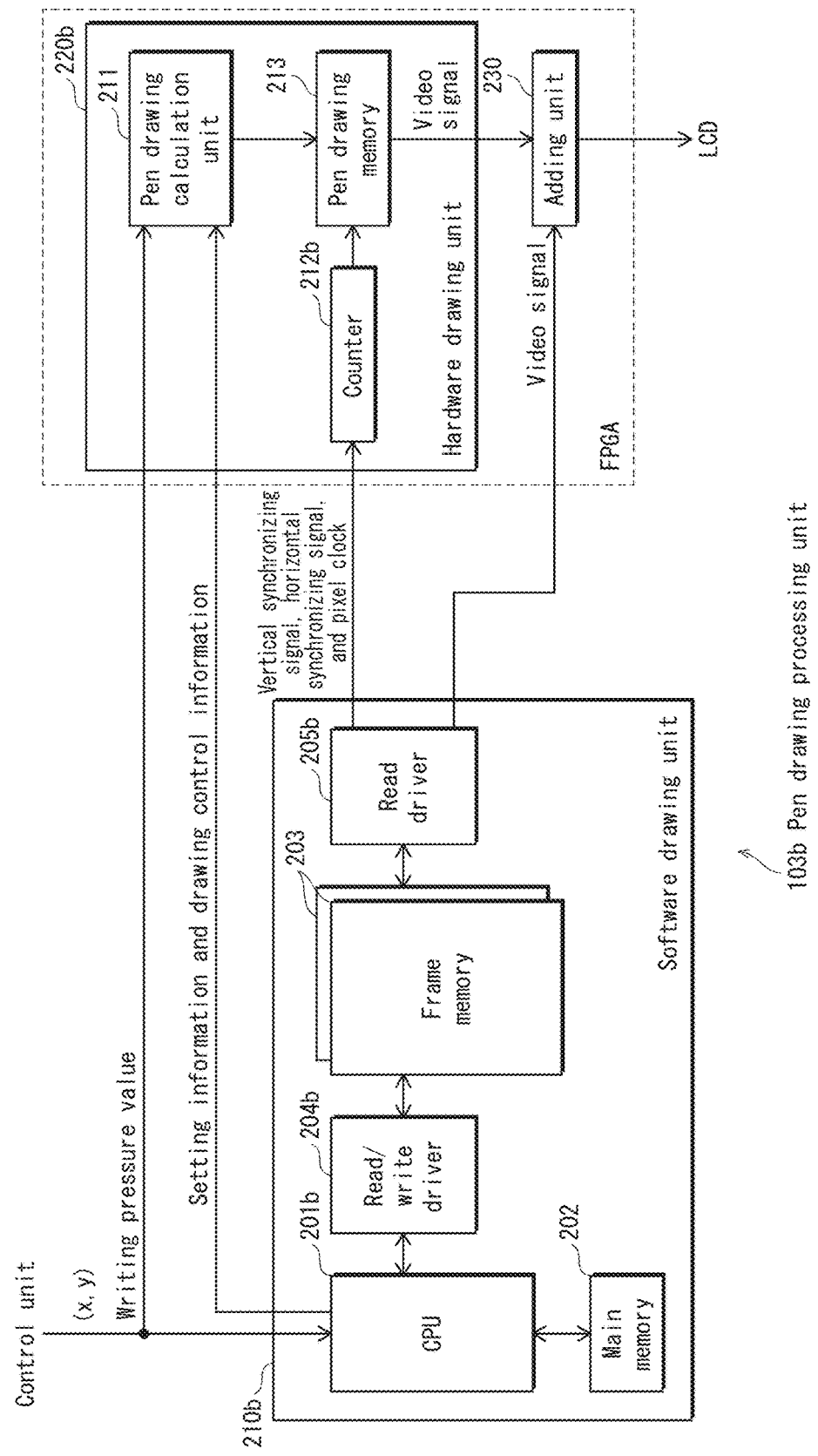
FIG. 15 illustrates the structure of pen drawing processing unit 103b in embodiment 3.

FIG. 15 is a block diagram illustrating the structure of a pen drawing processing unit 103b in the pen tablet pertaining to embodiment 3 in detail. As illustrated in FIG. 15, the pen drawing processing unit 103b includes: a software drawing unit 210b; a hardware drawing unit 220b; and the adding unit 230.

(Structure of Software Drawing Unit 210b)

The software drawing unit 210b includes: a CPU 201b; the main memory 202; the frame memory 203; a read/write driver 204b; and a read driver 205b.

The main memory 202 and the frame memory 203 have already been described in embodiment 1. In addition to the functions executed by the CPU 201 in embodiment 1, the CPU 201b in embodiment 3 has a function of counting the number of frames that have been output. In addition, in embodiment 1, the read/write driver 204 and the read driver 205 each use a different one of the two memory areas of the frame memory 203 for processing a given frame. Further, the memory areas that the read/write driver 204 and the read driver 205 use are exchanged when processing proceeds to a subsequent frame. Meanwhile, the read/write driver 204b and the read driver 205 in embodiment 3 each switch to a different one of the two memory areas of the frame memory 203 when pen drawing processing by the software drawing unit 210b is completed.

(Operations in Software Drawing Processing)

Figure 16:
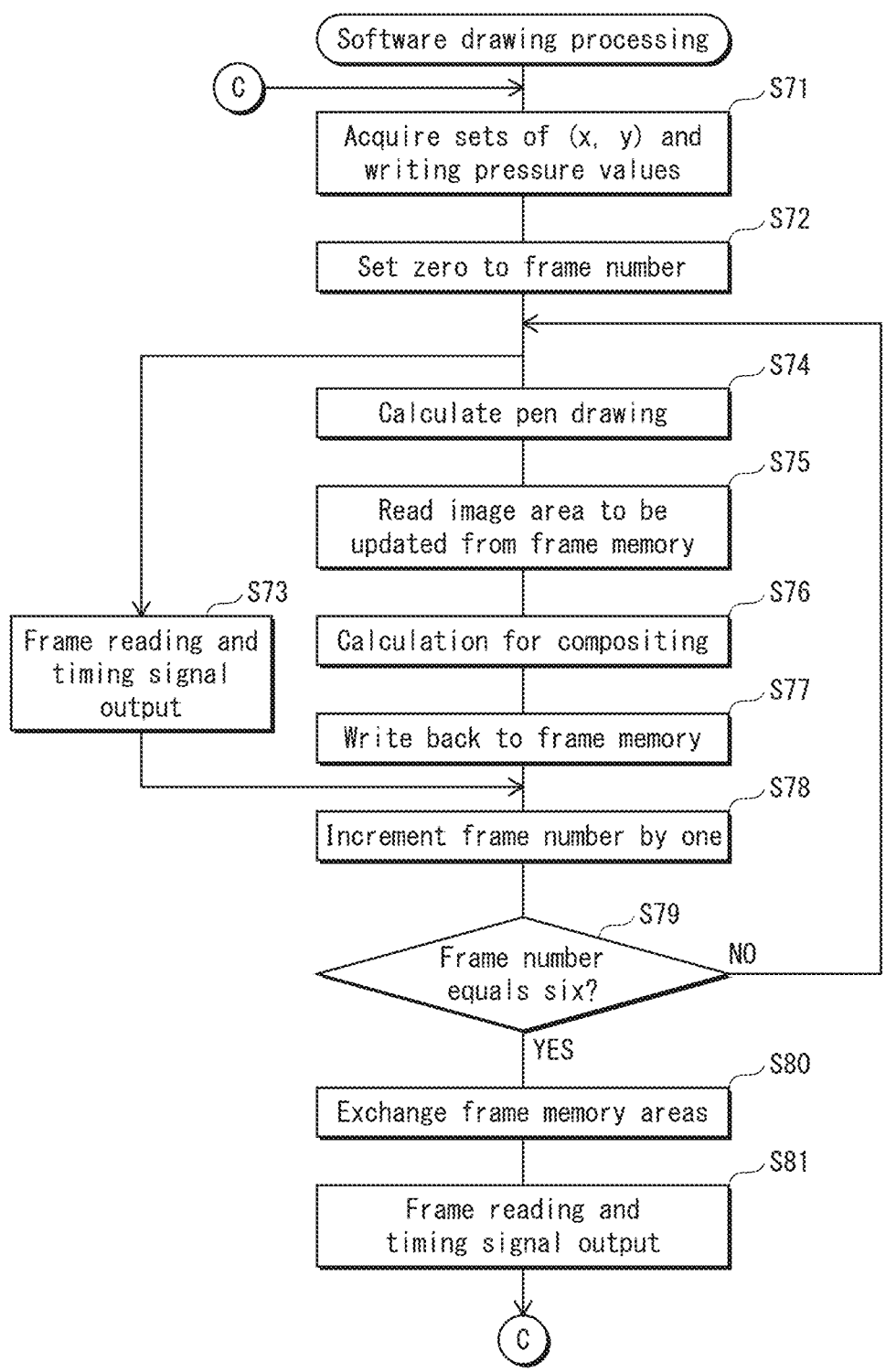
FIG. 16 is a flowchart of pen drawing processing in embodiment 3.

FIG. 16 is a flowchart indicating the flow of processing performed by the software drawing unit 210b. Note that at the point when the processing performed by the software drawing unit 210b is commenced, the setting information and the drawing control information have already been loaded into the main memory 202.

The CPU 201b receives input of a plurality of combinations of a coordinate value set and a writing pressure value one after another (Step S71). In the following, description is provided based on an exemplary case where the CPU 201b receives input of combinations of a coordinate value set and a writing pressure value that are detected during one stroke, i.e., during a period from when contact made by the stylus pen 1a is first detected until when the contact is no longer detected.

The CPU 201b stores zero (0) as the initial value of a value indicating the output number of frames (Step S72).

The read driver 205b outputs timing signals while reading out pixel signals from the frame memory 203 (Step S73). The pixel signals are input to the adding unit 230, and the timing signals are input to a counter 212b.

While the read driver 205b is executing the processing in Step S73, the CPU 201b executes the sequence of processing including Steps S74 through S77.

First, the CPU 201b generates a pen drawing image by performing calculation by using some of the coordinate value sets acquired in Step S71, some of the writing pressure values acquired in Step S71, and the setting information and the drawing control information stored in the main memory 202 (Step S74). The generation of pen drawing images has already been described in embodiment 1.

Subsequently, the CPU 201b reads out, from the frame memory 203, an image corresponding to an area to be updated (Step S75). Note that the processing in Step S75 may be skipped when an image stored in the frame memory 203 is not necessary for composition with the pen drawing image.

Following this, the CPU 201b either composites the pen drawing image with the image read in Step S75, or composites the pen drawing image with a background image input from an external source (Step S76). Then, the CPU 201b writes back the composite image into the frame memory 203 (Step S77).

Subsequently, the CPU 201b increments the value indicating the output number of frames by one (1) (Step S78), and determines whether or not the output number of frames has reached six (6).

When the output number of frames is smaller than six (6) (NO in Step S79), processing returns to Steps S73 and S74, from which processing is continued. When the output number of frames reaches six (6) (YES in Step S69), the CPU 201b exchanges the memory area allocated to image reading and the memory area allocated to image writing (Step S80).

The read driver 205b reads out pixel signals from the memory area of the frame memory 203 with respect to which pen drawing processing has been completed and outputs a timing signal (Step S73). The pixel signals in Step S73 are input to the adding unit 230, and the timing signal in Step S73 is input to the counter 212b.

As description is provided up to this point, the frame image output by the software drawing unit 210b is a background image until the pen drawing processing is completed, whereas the frame image output by the software drawing unit 210b includes an entirety of a pen drawing composited with the background image when the pen drawing processing is completed.

(Hardware Drawing Unit 220b)

Figure 17:
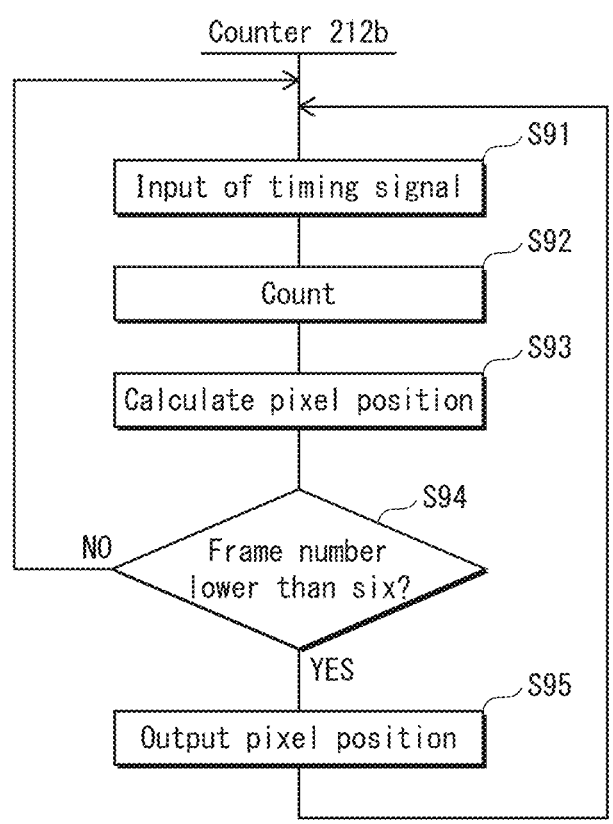
FIG. 17 illustrates processing by counter 212b in hardware drawing unit 220b in embodiment 3.

The following describes the hardware drawing unit 220b, with reference to FIGS. 15 and 17.

As illustrated in FIG. 15, the hardware drawing unit 220b includes: the pen drawing calculation unit 211; the counter 212b; and the pen drawing memory 213. The hardware drawing unit 220b is dedicated hardware for pen drawing processing. The hardware drawing unit 220b is implemented by using a timing processing circuit, such as a FPGA.

The pen drawing calculation unit 211 and the pen drawing memory 213 have already been described in embodiment 1.

FIG. 17 illustrates processing by the counter 212b. As illustrated in FIG. 17, the counter 212b receives timing signals from the read driver 205b of the software drawing unit 210b (Step S91). The timing signals each include a vertical synchronizing signal, a horizontal synchronizing signal, and a pixel clock. The counter 212b counts the pixel clock, and counts a line number and a frame number based on the vertical synchronizing signal and the horizontal synchronizing signal (Step S92). Further, the counter 212b calculates a pixel position in the video signal output from the frame memory 203, based on the pixel number and the line number (Step S93).

When the counted frame number is smaller than six (6) (YES in Step S94), the counter 212b outputs the calculated pixel position to the pen drawing memory 213 (Step S95). When the calculated frame number reaches six (6) (NO in Step S94), the counter 212b terminates the output of pixel positions. Note that the pen drawing memory 213 outputs pen drawing images while pixel positions are input from the counter 212b. Due to this, when the frame number calculated by the counter 212b reaches six (6), the pen drawing memory 213 terminates the output of pen drawing images.

As such, the hardware drawing unit 220b in embodiment 3 continues to output pen drawing images from the pen drawing memory 213 until the pen drawing processing by the software drawing unit 210b is completed. However, the hardware drawing unit 220b in embodiment 3 terminates the output of pen drawing images from the pen drawing memory 213 when the pen drawing processing by the software drawing unit 210b is completed.

(Example of Display by Touch Panel 101)

Figure 18:
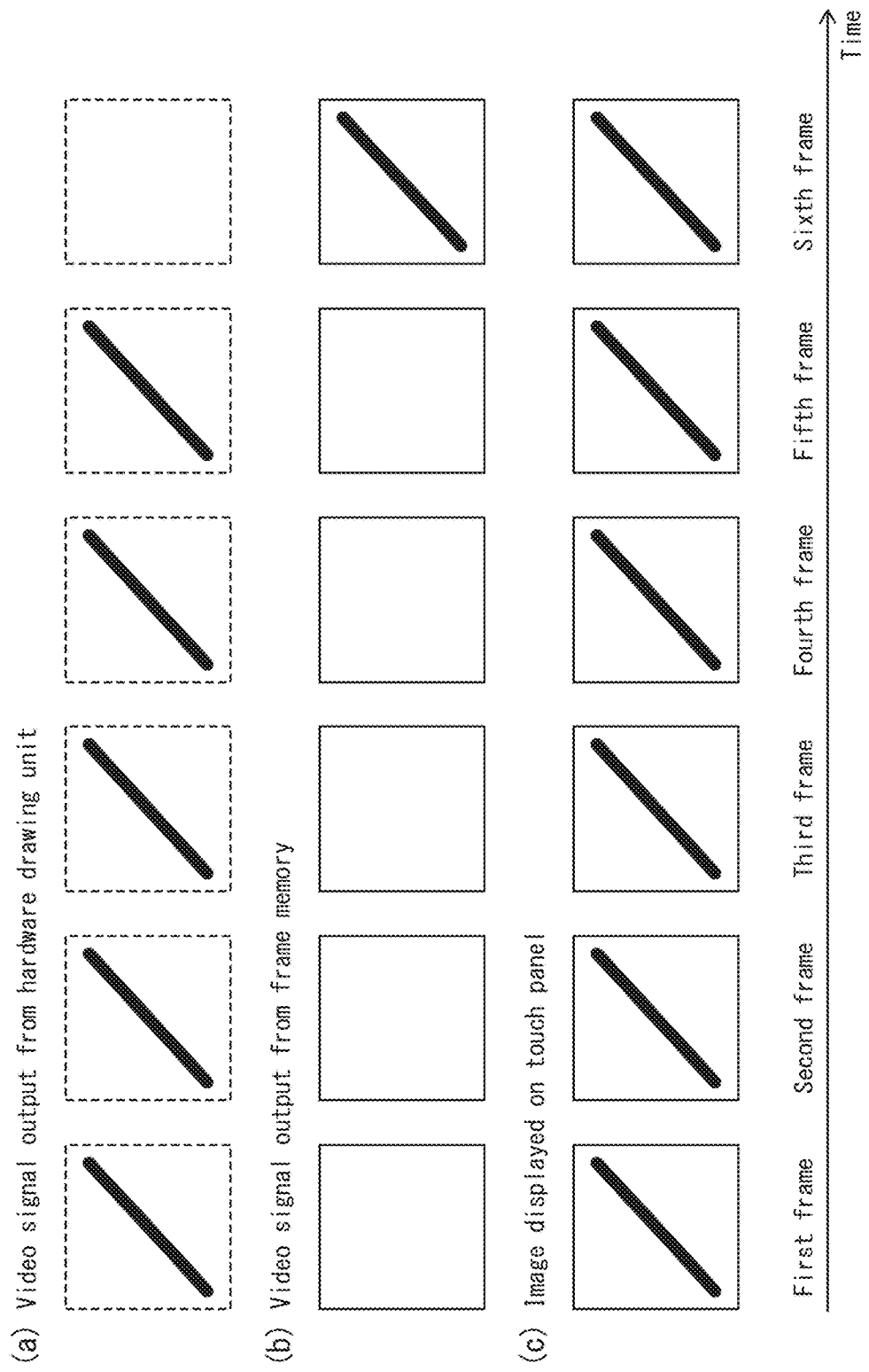
FIG. 18 includes portions (a), (b), and (c) for explaining images displayed on touch panel 101 in embodiment 3.

As description is provided up to this point, the frame image output by the software drawing unit 210b is a background image until pen drawing processing by the software drawing unit 210b is completed, whereas the frame image output by the software drawing unit 210b includes an entirety of a pen drawing composited with the background image when the pen drawing processing is completed, as illustrated in portion (b) of FIG. 18. Meanwhile, the hardware drawing unit 220b continues to output pen drawing images until the pen drawing processing by the software drawing unit 210b is completed, and terminates the output of pen drawing images when the pen drawing processing by the software drawing unit 210b is completed.

By the video signal output from the software drawing unit 210b and the video signal output from the hardware drawing unit 220b being output to the panel drive circuit after being added together by the adding unit 230, the entirety of a pen drawing is displayed on the touch panel 101 immediately following the completion of the pen input by the user, as illustrated in portion (c) of FIG. 18. From this point and on, the pen drawing is always displayed at a fixed tone.

5. Other Modifications

In the above, description is provided of pen tablets, which are embodiments of the information input/display device and the information input/display method pertaining to the present disclosure. However, the information input/display device and the information input/display method pertaining to the present disclosure are not limited to the embodiments described above, and modifications such as those described in the following may be made with respect to the pen tablets described above.

(1) In the embodiments, description is provided while taking as an example a pen tablet having a touch panel, and with respect to which lines are input through touch operations performed by using a stylus pen. However, the information input/display device pertaining to the present disclosure need not be a pen tablet operated by using a stylus pen. Further, in the embodiments, description is provided while taking as an example a pen tablet including a touch panel, which is an integration of a sensor (one example of which is a touchpad) and a display unit (one example of which is an LCD). However, the pen tablet need not include such a touch panel. That is, it suffices for the pen tablet to include a sensor for position detection and a display unit for image display, and the sensor and the display unit need not be integrated into a single component.

For example, the information input/display device pertaining to the present invention may be a device with respect to which a user performs input by touching a touch panel by using his/her finger without using a stylus pen.

Alternatively, the information input/display device pertaining to the present disclosure may be a smartphone, which typically has a function of connecting to a communication network for portable telephones and performing voice communication with other telephone devices.

Further, the information input/display device pertaining to the present disclosure may include a pointing device other than a touchpad. Examples of such a pointing device include a computer mouse, a trackball, and a joystick. Users may perform the input of lines by operating such pointing devices.

Further, the information input/display device pertaining to the present disclosure may include a 3D input device. Here, a 3D input device refers to an input device that detects motions (positional change) of user hands and fingers in a 3D space by using, for example, an infrared sensor, and controls a computer based on such motions. One example of such a 3D input device is the Leap Motion Controller manufactured by Leap Motion, Inc. When the information input/display device pertaining to the present disclosure includes such a 3D input device, a user need not operate a pointing device such as a touch panel to input lines, and is able to input lines by moving his/her hand or finger in the air.

In addition, the embodiments provide description while taking as an example a pen tablet including a CPU with low processing ability. However, the information input/display device pertaining to the present disclosure need not be applied to a device including a CPU with low processing ability. Needless to say, the information input/display device pertaining to the present disclosure is applicable to devices including CPUs with high processing ability. For example, applying the information input/display device pertaining to the present disclosure to a professional-use tablet that needs to provide to its user a natural writing/drawing experience enables high-speed drawing, which shall satisfy users of the professional-use tablet.

As description has been provided up to this point, the information input/display device pertaining to the present disclosure is applicable to any device that receives input operations from users and performs drawing of lines according to the input operations.

(2) In Step S1 in FIG. 8, acquisition is performed of all combinations of a coordinate value set and a writing pressure value detected during an input operation corresponding to one stroke. However, such information need not be acquired in Step S1 in FIG. 8. For example, a user may draw a line having great length through one stroke. Taking this into consideration, the software drawing unit 210 may acquire and store therein combinations of a coordinate value set and a writing pressure value one after another, and commence the processing in Step S2 and the processing in and following Step S3 when the number of combinations stored therein reaches a predetermined number. This similarly applies to embodiment 2 (FIG. 12) and embodiment 3 (FIG. 16).

(3) In each of the embodiments, timing signals are output from the read driver of the software drawing unit, and the counter of the hardware drawing unit counts a frame number, a line number, and a pixel number based on a timing signal. However, timing signals need not be output from the read driver of the software drawing unit, and the specification of a frame number, a line number, and a pixel number need not be performed based on a timing signal. That is, other configurations are possible, provided that the hardware drawing unit is able to acquire frame numbers, line numbers, and pixel numbers. For example, the software drawing unit may output frame numbers, line numbers, and pixel numbers. When making such a modification, the hardware drawing unit no longer needs to include the counter. Further, when making such a modification, partial drive is applicable. Partial drive refers to a configuration where contents displayed on a display are updated only at an area in one screen where pen drawing is updated. When applying this partial drive, the amount of time required from input to display is reduced to a further extent, and in addition, the power consumed when updating displayed contents is also reduced.

(4) In each of the embodiments, description is provided while taking an LCD as one example of the display unit. However and needless to say, the display unit need not be an LCD, as long as the display unit has the function of displaying on a screen. For example, an organic EL (organic electroluminescence) display may be used in place of an LCD. Note that it is exemplary that a display with high display response speed be used in the embodiments in order to reduce the amount of time from input to display.

(5) In each of the embodiments, the touch panel detects coordinate value sets indicating contact positions and writing pressure values at the contact positions, and outputs the coordinate value sets and writing pressure values to the CPU and the hardware drawing unit. However, the touch panel need not detect both coordinate value sets and writing pressure values. It suffices for the touch panel to be capable of detecting contact positions and outputting the contact positions to the CPU and the hardware processing unit. When making such a modification, the drawing control information need not include mathematical expressions indicating the relationship between writing pressure value and pen tip size. Further, when making such a modification, the pen drawing processing unit performs drawing at a received coordinate value set by using the pen tip shape corresponding to the standard writing pressure.

(6) In embodiment 2, the software drawing unit 210*a* gradually changes tone of pixel signals. In specific, the software drawing unit 210*a* changes tone such that one area that has a size of one third of a frame and that is processed within a given instance of the predetermined time period has a tone differing from another area that has a size of one third of a frame and that is processed within a subsequent instance of the predetermined time period. However, the software drawing unit 210*a* need not change tone in such a manner. That is, it suffices for the software drawing unit 210*a* to gradually change image tone of the pen drawing image. For example, the software drawing unit 210*a* may change tone such that a tone of pixel signals in one line differs from a tone of pixel signal in another line. Alternatively, the software drawing unit 210*a* may change tone pixel by pixel.

Further, the calculation of weights provided to a luminance value described in embodiment 2 is a mere example of such calculation. That is, the calculation of weights need not be performed in the manner described in embodiment 2. In specific, it suffices for at least one of the software drawing unit 210*a* and the hardware drawing unit 220*a* to change tone so that the tone of pixel signals after the adding does not exceed the tone specified by the user. For example, a modification may be made such that the software drawing unit 210*a* changes tone to become darker as time elapses in drawing processing, and the hardware drawing unit 220*a* changes tone to become lighter as time elapses in drawing processing so that the tone of pen drawing after the adding equals the specified tone.

Further, the pen drawing calculation unit 211*a* in embodiment 2 calculates the number of frames N and the weighting coefficient 1. However, a modification may be made such that such calculation is performed not by the pen drawing calculation unit 211*a* but by the CPU 201*a*, and the pen drawing calculation unit 211*a* receives the number of frames N and the weighting coefficient 1 from the CPU 201*a*.

(7) The hardware drawing unit 220*a* in embodiment 2 includes the weight calculation unit 215. However, the hardware drawing unit 220*a* need not include the weight calculation unit 215. It suffices that tone of pen drawing input from the hardware drawing unit 220*a* to the adding unit 230 becomes lighter as time elapses in drawing processing. For example, a modification may be made such that the pen drawing calculation unit 211 generates a plurality of pen drawing images whose tones differ from one another, and stores such pen drawing images to the pen drawing memory 213. Further, when making such a modification, the pen drawing memory 213 may output the pen drawing images in order from those having darker tone to those having lighter tone, as time elapses in drawing processing.

(8) In embodiment 3, pen drawing images generated by the hardware drawing unit 220*b* are output for the first to fifth frames, and frame images generated by the software drawing unit 210*b* are output starting from the sixth frame. However, such description is provided as one example. That is, it suffices for the switching between output from the hardware drawing unit 220*b* and the output from the software drawing unit 210*b* to be performed after pen drawing processing by the software drawing unit 210*b* is completed. For example, the switching may be performed such that frame images generated by the software drawing unit 210*b* are output starting from the fifth frame, or such that frame images generated by the software drawing unit 210*b* are output starting from the seventh frame.

Alternatively, by making, for example, a modification such that a signal indicating completion of pen drawing processing is input from the software drawing unit 210*b* to the hardware drawing unit 210*b*, fixed values as described above need not be used. When making such a modification, even when the processing speed of the software drawing unit 210*b* when performing the pen drawing processing varies depending upon processing load of the CPU 201*b*, the point at which the switching above is performed can be changed flexibly.

Figure 19:
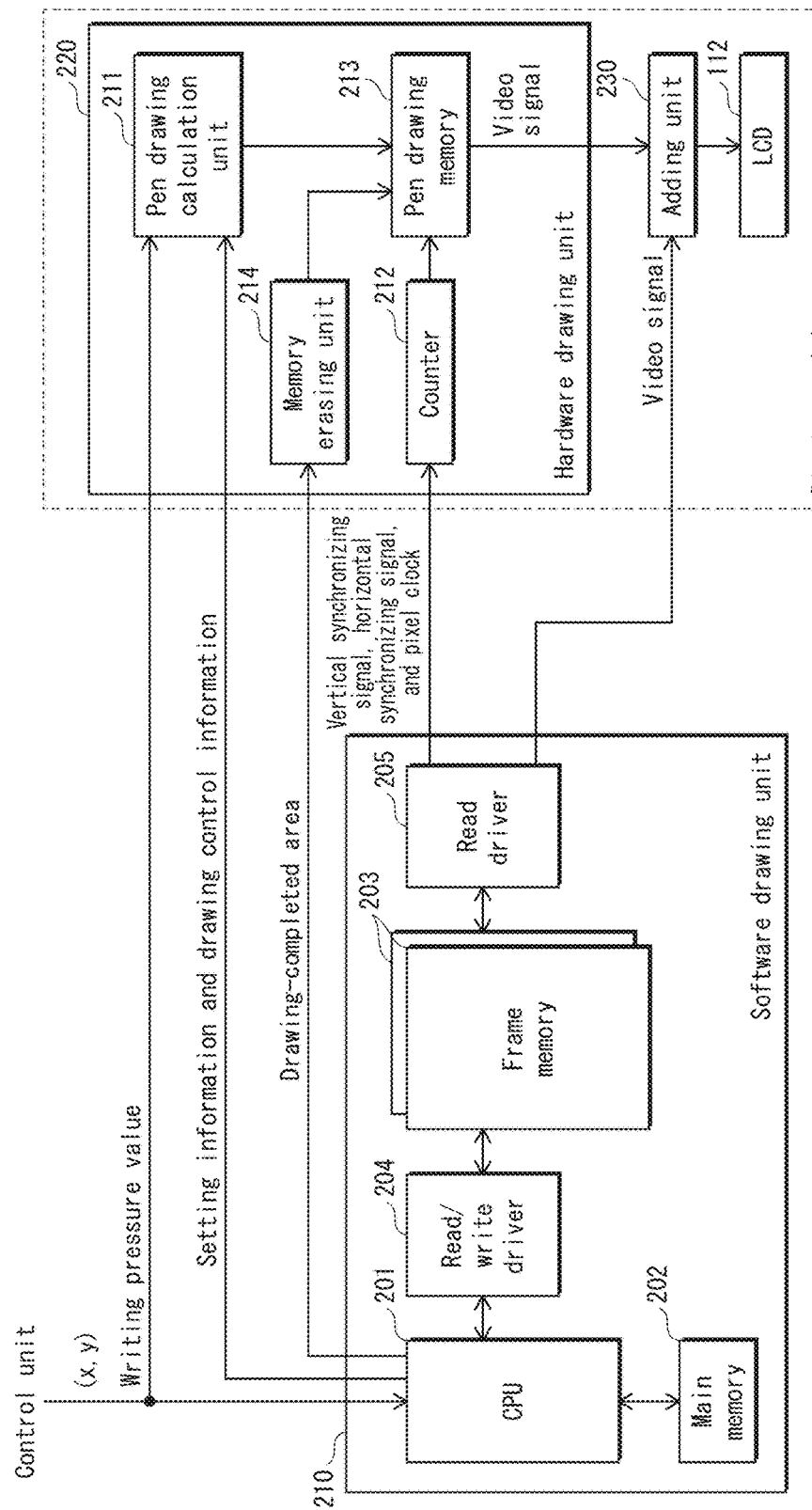
FIG. 19 is a diagram related to modification (9), for explaining an example of incorporating hardware drawing unit 220 and adding unit 230 in display module.

(9) In embodiment 1, the hardware drawing unit 220 and the adding unit 230 are implemented by using a FPGA, as illustrated in FIG. 6. However, in the information input/display device pertaining to the present disclosure, the hardware drawing unit 220 and the adding unit 230 need not be implemented by using a FPGA. For example, a modification may be made such that the hardware drawing unit 220 and the adding unit 230 are incorporated into a display module that includes the LCD 112, as illustrated in FIG. 19.

This similarly applies to embodiment 2. That is, the hardware drawing unit 220*a* and the adding unit 230 need not be implemented by using an FPGA, and may be incorporated into a display module including the LCD 112.

This similarly applies to embodiment 3. That is, the hardware drawing unit 220*b* and the adding unit 230 need not be implemented by using an FPGA, and may be incorporated into a display module including the LCD 112.

Figure 20:
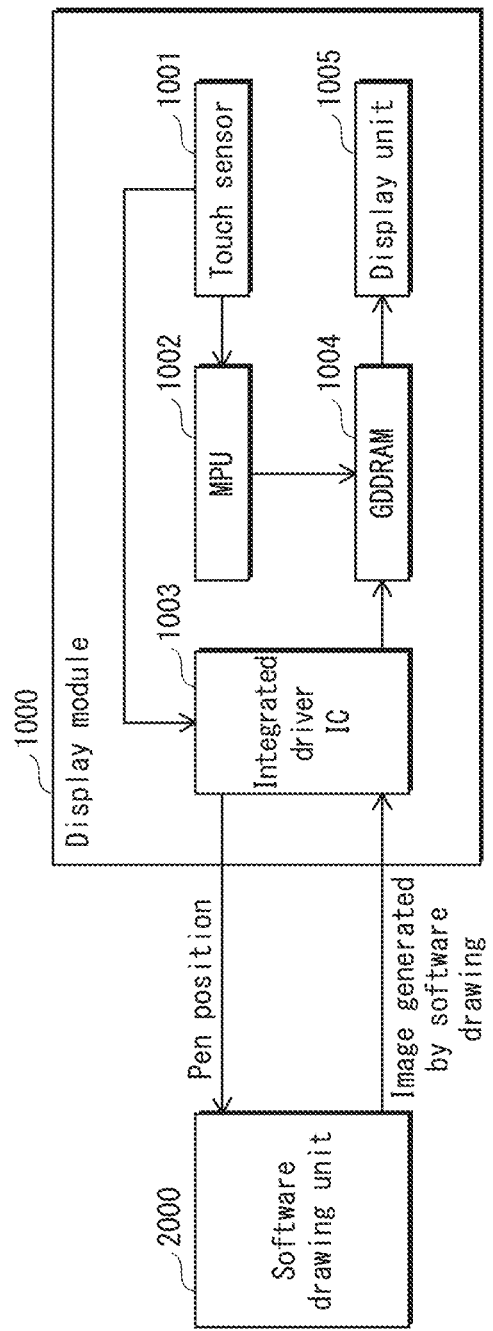
FIG. 20 is a diagram related to modification (10), for explaining display module 1000.

(10) FIG. 20 illustrates one example of the structure of such a display module. FIG. 20 illustrates a display module 1000, which includes a touch sensor 1001; a MPU (microprocessing unit) 1002; an integrated driver IC 1003; a GDDRAM (graphic display data random access memory) 1004; and a display unit 1005. The display module 1000 has integrated therein the hardware drawing unit, the adding unit, and the touch panel, examples of which are described in the embodiments.

The touch sensor 1001, when detecting contact by a pen, notifies the MPU 1002 of positions of the pen. The MPU 1002 then draws a continuous line based on the positions of the pen, and stores the continuous line to the GDDRAM 1004.

Further, the touch sensor 1001 notifies a software drawing unit 2000 of the positions of the pen, via the integrated driver IC 1003. The software drawing unit 2000 generates a frame image including a continuous line that is based on the positions of the pen.

The integrated driver IC 1003 receives the frame image generated by the software drawing unit 2000 and stores the frame image to the GDDRAM 1004.

The GDDRAM 1004 outputs video signals to the display unit 1005 at a refresh rate (e.g., 60 Hz) of the display unit 1005.

In each of embodiments 1 and 2, video signals from the software drawing unit and video signals from the hardware drawing unit are output at the same frequency, so that the pen drawings generated by the hardware drawing unit (drawing of a continuous line) can be overlaid onto the frame images generated by the software drawing unit. In specific, when the refresh rate of the LCD is 60 Hz, the software drawing unit needs to output video signals at the frequency of 60 Hz.

Meanwhile, the display module 1000, due to including the GDDRAM 1004 therein, is capable of storing frame images therein. Thus, by causing the MPU 1002 to draw images of a continuous line at a high speed and storing the result of the drawing to the GDDRAM 1004, the display module 1000 is able to output frame images including images of a continuous line at the refresh rate of the display unit 1005 in all cases.

When using the display module 1000 as described above, the software drawing unit 2000 no longer needs to output video signals at a frequency corresponding to the speed of the high-speed drawing processing performed by the MPU 1002 and the refresh rate of the display unit 1005. For example, even if the refresh rate of the display unit 1005 is 60 Hz, the software drawing unit 2000 may output video signals at a lower frequency of approximately 10 to 20 Hz. In addition, a modification may be made such that the software drawing unit 2000 performs the partial drive as described above, and outputs video signals corresponding to updated portions intermittently.

As such, the software drawing unit 2000 is capable of outputting video signals at a low frequency and outputting only updated portions intermittently. As such, the CPU included in the software processing unit 2000 is able to perform processing other than drawing processing with higher priority than the drawing processing.

(11) The information input/display device pertaining to the present disclosure may be implemented by using a cloud computing system. FIG. 21 illustrates one example of the information input/display device pertaining to the present disclosure implemented by using a cloud computing system. The information input/display device illustrated in FIG. 21 includes a wearable terminal 3000 and a software drawing unit 4000 that is a cloud resource.

The wearable terminal 3000 is a wrist watch type terminal of small size and weight, and includes a touch panel 3001, a hardware drawing unit, and a wireless communication unit for wireless communication with cloud resources. The wearable terminal, needless to say, may include in addition to the above-described components various sensors such as a camera and a microphone and may have addition functions such as a GPS (Global Positioning System) function. However, the wearable terminal 3000 does not include a CPU or a software drawing unit such as that described in the embodiments.

The wearable terminal 3000, when receiving user input via the touch panel 3001, draws an image of a continuous line via the hardware drawing unit included therein. Further, the wearable terminal 3000 outputs the result of the drawing to the touch panel 3001, and in addition, notifies the software drawing unit 4000, which is a cloud resource, of contact positions via the wireless communication unit and requests that the software drawing unit 4000 perform software drawing processing. Subsequently, when receiving a video signal from the software drawing unit 4000 via the wireless communication unit, the wearable terminal 3000 composites the video signal with the image of a continuous line generated by the hardware drawing unit, and outputs the result of the compositing to the touch panel 3001. Here, the cloud resource may be implemented by using a smartphone or a tablet terminal that includes a CPU, or may be implemented by using a server device included in a network.

Although a wrist watch type terminal is illustrated in FIG. 21 as one example of the wearable terminal 3000, the wearable terminal 3000 need not be a wrist watch type terminal. Further, when making the above modification, the user-side resource in the information input/display device pertaining to the present disclosure implemented by using a cloud computing system need not be a so-called wearable terminal, which is worn by a user. That is, the information input/display device pertaining to the present disclosure may be implemented by using a combination of a terminal having only a CPU with low processing ability and a cloud resource, or a combination of a terminal not having a CPU and a cloud resource.

(12) The embodiments and modifications described above may be combined as appropriate.

6. Supplement

As described above, the present disclosure encompasses the aspects of invention described in the following, for example.

(a) One aspect of the present disclosure is an information input/display device including: a sensor detecting contact and outputting contact positions; a display unit displaying video signals each corresponding to one screen; a first drawing unit generating first video signals each corresponding to one screen, when displayed, that includes an image of a drawing of a continuous line formed by the contact positions; a second drawing unit generating second video signals each corresponding to an image of the drawing of the continuous line, the second drawing unit generating images of the drawing of the continuous line at a higher speed than the first drawing unit; and an adding unit adding each of the second video signals to a corresponding one of the first video signals. In the information input/display device pertaining to one aspect of the present disclosure, images of the drawing of the continuous line generated by at least one of the first drawing unit and the second drawing unit change as time elapses in drawing processing.

According to this, the second drawing unit with high processing speed performs pen drawing. As such, the amount of time required from pen input to display is reduced. As such, users are provided with a natural writing/drawing experience.

In addition, video signals output by the first drawing unit and the second drawing unit changes as time elapses in drawing processing. This enables adjusting a video signal portion where the images of the drawing of the continuous line generated by the first drawing unit and the second drawing unit overlap one another.

(b) The information input/display device pertaining to one aspect of the present disclosure may further include a setting information storage unit acquiring and storing therein setting information indicating luminance of the drawing of the continuous line, and luminance of the images of the drawing of the continuous line generated by the at least one of the first drawing unit and the second drawing unit may change as time elapses in the drawing processing such that luminance of the video signals displayed by the display unit, which are acquired through the adding by the adding unit, does not exceed the luminance indicated by the setting information.

According to this, the display luminance of the portion where the images of the drawing of the continuous line generated by the first drawing unit and the second drawing unit overlap one another is within a predetermined range with respect to the luminance having been set. In particular, visually prominent changes are prevented, such as where the drawing of the continuous line, which should be displayed in the color gray (half tone), is displayed in white due to overlapping of half tone images generated by the first drawing unit and the second drawing unit.

(c) In the information input/display device pertaining to one aspect of the present disclosure, the second drawing unit may include: a memory; and a drawing calculation unit acquiring the contact positions from the sensor, generating the second video signals by using drawing control information indicating a dot pattern, and storing the second video signals to the memory, and the memory, when provided with a notification of a pixel position in a given one of the first video signals, may output a pixel signal corresponding to the pixel position, from among a plurality of pixel signals composing one of the second video signals corresponding to the given one of the first video signals.

According to this, the adding unit is able to composite the image of the drawing of the continuous line generated by the second drawing unit with respect to an appropriate position in the frame image generated by the first drawing unit.

(d) In the information input/display device pertaining to one aspect of the present disclosure, each time the first drawing unit generates an image of the drawing of the continuous line, the first drawing unit may output, to the second drawing unit, completion position information indicating a part of the drawing of the continuous line that the image of the drawing of the continuous line corresponds to, and the second drawing unit may further include: a memory erasing unit that erases, from the memory, a part of a corresponding one of images of the drawing of the continuous line stored therein, the erased part corresponding to the position indicated by the completion position information.

According to this, the image of the drawing of the continuous line generated by the first drawing unit and the image of the drawing of the continuous line generated by the second drawing unit do not overlap with one another. As such, the display unit always displays the drawing of the continuous line at the same tone.

(e) In the information input/display device pertaining to one aspect of the present disclosure, the first drawing unit may change images of the drawing of the continuous line to become darker in tone as time elapses in the drawing processing, and the second drawing unit may change images of the drawing of the continuous line to become lighter in tone as time elapses in the drawing processing.

Here, tone of video signals can be changed, for example, by changing the luminance value of video signals to be written to the memory or by changing the luminance value of video signals having been read from the memory. Further, tone of video signals corresponding to full color images can be changed by changing the luminance values of the colors R, G, and B.

According to this, a situation is prevented where luminance exceeds that specified in the setting information when compositing of the image of the drawing of the continuous line generated by the first drawing unit and the image of the drawing of the continuous line generated by the second drawing unit is performed.

(f) In the information input/display device pertaining to one aspect of the present disclosure, the first drawing unit may generate the images of the drawing of the continuous line while changing a weight applied to the luminance indicated by the setting information as time elapses in the drawing processing, and the second drawing unit may further include a weight calculation unit changing a weight applied to pixel signals output from the memory as time elapses in the drawing processing, and inputting the weighted pixel signals to the adding unit.

According to this, the second drawing unit gradually changes the weight applied to video signals that are output from the memory, as time elapses in the drawing processing. Thus, the second drawing unit need not generate a plurality of video signals each with a different tone and store such video signals in the memory.

(g) In the information input/display device pertaining to one aspect of the present disclosure, the drawing calculation unit may generate the second video signals so that the second video signals differ from one another in tone, and store the second video signals to the memory, and the memory may output the second video signals in order from those having darker tone to those having lighter tone, in accordance with the elapsing time in the drawing processing.

According to this, the second drawing unit needs to store video signals corresponding to a plurality of images of the drawing of the continuous line to the memory. Meanwhile, there is no need of providing the second drawing unit with a weight calculation unit that performs weighting with respect to video signals that are output from the memory. As such, output delay is suppressed, while the adding unit is able to composite the image of the drawing of the continuous line generated by the second drawing unit with respect to an appropriate position in the image generated by the first drawing unit.

(h) Another aspect of the present disclosure is an information input/display device including: a sensor detecting contact and outputting contact positions; a display unit displaying video signals each corresponding to one screen; a first drawing unit generating first video signals each corresponding to one screen, when displayed, that includes an image of a drawing of a continuous line formed by the contact positions; a second drawing unit generating second video signals each corresponding to an image of the drawing of the continuous line, the second drawing unit generating images of the drawing of the continuous line at a higher speed than the first drawing unit; and an adding unit adding each of the second video signals to a corresponding one of the first video signals. In the information input/display device pertaining to another aspect of the present disclosure, the first drawing unit outputs one first video signal when having generated an image of the drawing of the continuous line that corresponds to one stroke, and the second drawing unit outputs the second video signals until the first drawing unit has generated an image of the drawing of the continuous line that corresponds to one stroke, and no longer outputs the second video signals when the first drawing unit has generated an image of the drawing of the continuous line that corresponds to one stroke.

Here, one stroke refers to the operation made from when contact made by the stylus pen $1a$ is first detected until when the contact is no longer detected.

According to this, the display unit displays an entirety of the drawing of the continuous line starting immediately following the completion of user input, and the drawing of the continuous line is displayed at the same tone from this point and on.

INDUSTRIAL APPLICABILITY

The information input/display device pertaining to the present disclosure is usable in industrial fields related to the manufacturing and marketing of pen tablets as a technology of reducing the amount of time from input to display and providing users with a natural writing/drawing experience.

REFERENCE SIGNS LIST 1 pen table
101, 3001 touch panel
102 storage unit
103, 103a, 103b pen drawing processing unit
104 control unit
105 communication control unit 106 antenna
107 camera
108 speaker
109 microphone
210, 210a, 210b, 2000, 4000 software drawing unit
220, 220a, 220b hardware drawing unit
230 adding unit
201, 201a, 201b CPU
202 main memory
203 frame memory
204, 204b read/write driver
205, 205b read driver
211, 211a pen drawing calculation unit
212, 212a, 212b counter
213 pen drawing memory
214 memory erasing unit
215 weight calculation unit
1000 display module
1001 touch sensor
1002 MPU
1003 integrated driver IC
1004 GDDRAM
1005 display unit
3000 wearable terminal

The invention claimed is:

1. An information input/display device, comprising:
a sensor detecting contact and outputting contact positions;
a display displaying video signals corresponding to one screen;
a first drawing component, including a processor, generating first video signals corresponding to the one screen that, when displayed, include an image of a drawing of a continuous line formed by the contact positions;
a second drawing component, including hardware circuitry, generating second video signals each corresponding to an image of the drawing of the continuous line, the second drawing component generating images of the drawing of the continuous line at a higher speed than the first drawing component;
an adder adding each of the second video signals to a corresponding one of the first video signals; and
a setting information storage acquiring and storing therein setting information indicating luminance of the drawing of the continuous line,
wherein images of the drawing of the continuous line generated by at least one of the first drawing component and the second drawing component change as time elapses in drawing processing,
wherein luminance of the images of the drawing of the continuous line generated by the at least one of the first drawing component and the second drawing component changes as time elapses in the drawing processing such that luminance of the video signals displayed by the display, which are acquired through the adding by the adder, does not exceed the luminance indicated by the setting information,
wherein the second drawing component includes
a memory; and
a drawing calculator acquiring the contact positions from the sensor, generating the second video signals by using drawing control information indicating a dot pattern, and storing the second video signals to the memory,
wherein the memory, when provided with a notification of a pixel position in a given one of the first video signals, outputs a pixel signal corresponding to the pixel position, from among a plurality of pixel signals composing one of the second video signals corresponding to the given one of the first video signals,
wherein the first drawing component changes images of the drawing of the continuous line to become darker in tone as time elapses in the drawing processing, and
wherein the second drawing component changes images of the drawing of the continuous line to become lighter in tone as time elapses in the drawing processing.

2. The information input/display device of claim 1,
wherein each time the first drawing component generates an image of the drawing of the continuous line, the first drawing component outputs, to the second drawing component, completion position information indicating a part of the drawing of the continuous line that the image of the drawing of the continuous line corresponds to, and
wherein the second drawing component further includes a memory eraser that erases, from the memory, a part of a corresponding one of images of the drawing of the continuous line stored therein, the erased part corresponding to the position indicated by the completion position information.

3. The information input/display device of claim 1,
wherein the first drawing unit generates the images of the drawing of the continuous line while changing a weight applied to the luminance indicated by the setting information as time elapses in the drawing processing, and
wherein the second drawing component further includes a weight calculator changing a weight applied to pixel signals output from the memory as time elapses in the drawing processing, and inputting the weighted pixel signals to the adder.

4. The information input/display device of claim 1,
wherein the drawing calculation component generates the second video signals so that the second video signals differ from one another in tone, and stores the second video signals to the memory, and
wherein the memory outputs the second video signals in order from those having darker tone to those having lighter tone, in accordance with the elapsing time in the drawing processing.

5. An information input/display device comprising:
a sensor detecting contact and outputting contact positions;
a display displaying video signals each corresponding to one screen;
a first drawing component, including a processor, generating first video signals corresponding to the one screen that, when displayed, include an image of a drawing of a continuous line formed by the contact positions;
a second drawing component, including hardware circuitry, generating second video signals each corresponding to an image of the drawing of the continuous line, the second drawing component generating images of the drawing of the continuous line at a higher speed than the first drawing component;
an adder adding each of the second video signals to a corresponding one of the first video signals; and
a setting information storage acquiring and storing therein setting information indicating luminance of the drawing of the continuous line,
wherein the first drawing component outputs one first video signal when having generated an image of the drawing of the continuous line that corresponds to one stroke, and wherein the second drawing component outputs the second video signals until the first drawing component has generated an image of the drawing of the continuous line that corresponds to one stroke, and no longer outputs the second video signals when the first drawing component has generated an image of the drawing of the continuous line that corresponds to one stroke, wherein luminance of the images of the drawing of the continuous line generated by the at least one of the first drawing component and the second drawing component changes as time elapses in the drawing processing such that luminance of the video signals displayed by the display, which are acquired through the adding by the adder, does not exceed the luminance indicated by the setting information, wherein the second drawing component includes
- a memory; and
- a drawing calculator acquiring the contact positions from the sensor, generating the second video signals by using drawing control information indicating a dot pattern, and storing the second video signals to the memory,
- wherein the memory, when provided with a notification of a pixel position in a given one of the first video signals, outputs a pixel signal corresponding to the pixel position, from among a plurality of pixel signals composing one of the second video signals corresponding to the given one of the first video signals, wherein the first drawing component changes images of the drawing of the continuous line to become darker in tone as time elapses in the drawing processing, and wherein the second drawing component changes images of the drawing of the continuous line to become lighter in tone as time elapses in the drawing processing.

6. An information input/display method used in an information input/display device including a sensor and a display displaying video signals corresponding to one screen, the method comprising:

detecting contact and outputting contact positions;

generating first video signals each corresponding to one screen that, when displayed, include an image of a drawing of a continuous line formed by the contact positions;

generating second video signals each corresponding to an image of the drawing of the continuous line at a higher speed than in the generating first video signals;

adding each of the second video signals to a corresponding one of the first video signals; and acquiring and storing setting information indicating luminance of the drawing of the continuous line, wherein images of the drawing of the continuous line generated by at least one of the generating first video signals and the generating second video signals change as time elapses in drawing processing, wherein luminance of the images of the drawing of the continuous line generated by the at least one of the first drawing component and the second drawing component changes as time elapses in the drawing processing such that luminance of the video signals displayed by the display, which are acquired through the adding, does not exceed the luminance indicated by the setting information, wherein the generating second video signals includes
acquiring the contact positions from the sensor, generating the second video signals by using drawing control information indicating a dot pattern, and storing the second video signals in a memory, wherein the memory, when provided with a notification of a pixel position in a given one of the first video signals, outputs a pixel signal corresponding to the pixel position, from among a plurality of pixel signals composing one of the second video signals corresponding to the given one of the first video signals, wherein the generating first video signals changes images of the drawing of the continuous line to become darker in tone as time elapses in the drawing processing, and wherein the generating the second video signals changes images of the drawing of the continuous line to become lighter in tone as time elapses in the drawing processing.

7. An information input/display method used in an information input/display device including a sensor and a display displaying video signals each corresponding to one screen, the method comprising:

detecting contact and outputting contact positions;

generating first video signals corresponding to the one screen, that when displayed, include an image of a drawing of a continuous line formed by the contact positions;

generating second video signals each corresponding to an image of the drawing of the continuous line at a higher speed than in the generating first video signals;

adding each of the second video signals to a corresponding one of the first video signals; and acquiring and storing setting information indicating luminance of the drawing of the continuous line, wherein the generating first video signals outputs one first video signal when having generated an image of the drawing of the continuous line that corresponds to one stroke, wherein the generating second video signals outputs the second video signals until the generating first video signals drawing step has generated an image of the drawing of the continuous line that corresponds to one stroke, and no longer outputs the second video signals when the generating first video signals has generated an image of the drawing of the continuous line that corresponds to one stroke, wherein luminance of the images of the drawing of the continuous line generated by the at least one of the first drawing component and the second drawing component changes as time elapses in the drawing processing such that luminance of the video signals displayed by the display, which are acquired through the adding, does not exceed the luminance indicated by the setting information, wherein the generating second video signals includes
acquiring the contact positions from the sensor, generating the second video signals by using drawing control information indicating a dot pattern, and storing the second video signals in a memory, wherein the memory, when provided with a notification of a pixel position in a given one of the first video signals, outputs a pixel signal corresponding to the pixel position, from among a plurality of pixel signals composing one of the second video signals corresponding to the given one of the first video signals, wherein the generating first video signals changes images of the drawing of the continuous line to become darker in tone as time elapses in the drawing processing, and wherein the generating the second video signals changes images of the drawing of the continuous line to become lighter in tone as time elapses in the drawing processing.

* * * * *